(12) United States Patent
Castañeda Garcia et al.

(10) Patent No.: US 11,165,616 B2
(45) Date of Patent: Nov. 2, 2021

(54) CELL SEARCH OF USER EQUIPMENT IN ACCORDANCE WITH CELL SEARCH SLOTS ASSOCIATED WITH GROUPS OF BASE STATIONS

(71) Applicant: Huawei Technologies Co., Ltd., Shenzhen (CN)

(72) Inventors: Mario Hernán Castañeda Garcia, Munich (DE); Nikola Vucic, Munich (DE); Jian Luo, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/752,217

(22) Filed: Jan. 24, 2020

(65) Prior Publication Data

US 2020/0162297 A1 May 21, 2020

Related U.S. Application Data

(63) Continuation of application No. PCT/EP2017/068607, filed on Jul. 24, 2017.

(51) Int. Cl.
*H04L 27/26* (2006.01)
*H04J 11/00* (2006.01)
(Continued)

(52) U.S. Cl.
CPC ...... *H04L 27/2613* (2013.01); *H04J 11/0069* (2013.01); *H04L 5/0048* (2013.01);
(Continued)

(58) Field of Classification Search
CPC .............. H04L 27/2613; H04L 5/0048; H04L 27/2655; H04L 27/2657; H04J 11/0069;
(Continued)

(56) References Cited

U.S. PATENT DOCUMENTS

| | | | |
|---|---|---|---|
| 5,848,357 A * | 12/1998 | Dehner | H04B 7/2621 455/447 |
| 2004/0146025 A1* | 7/2004 | Hwang | H04L 1/0618 370/334 |

(Continued)

FOREIGN PATENT DOCUMENTS

| | | |
|---|---|---|
| CN | 1494709 A | 5/2004 |
| CN | 101115269 A | 1/2008 |

(Continued)

OTHER PUBLICATIONS

Shen et al., "Neighboring Cell Search for LTE Systems," IEEE Transactions on Wireless Communications, vol. 11, No. 3, pp. 908-919, Institute of Electrical and Electronics Engineers, New York, New York (Mar. 2012).

(Continued)

*Primary Examiner* — Fred A Casca
(74) *Attorney, Agent, or Firm* — Leydig, Voit & Mayer, Ltd.

(57) ABSTRACT

A base station configured to operate in accordance with a periodically repeated synchronization period is provided. The synchronization period comprises a plurality of successive pilot slots, the pilot slots being associated with groups of base stations in a one-to-one relationship. The base station is configured to be a member of a first group among the groups of base stations and to transmit, in each repetition of the synchronization period, one or more pilot signals in the pilot slot associated with the first group.

12 Claims, 19 Drawing Sheets

(51) Int. Cl.
H04L 5/00 (2006.01)
H04W 48/12 (2009.01)
H04W 48/16 (2009.01)

(52) U.S. Cl.
CPC ......... *H04L 27/2655* (2013.01); *H04W 48/12* (2013.01); *H04W 48/16* (2013.01)

(58) Field of Classification Search
CPC .... H04J 11/0079; H04J 11/00; H04J 11/0093; H04J 1/7083; H04J 2201/70702; H04W 48/12; H04W 48/16; H04W 56/00; H04B 1/7083; H04B 2201/70701
See application file for complete search history.

(56) References Cited

U.S. PATENT DOCUMENTS

| | | | |
|---|---|---|---|
| 2007/0041348 A1* | 2/2007 | Kwun | H04L 25/03866 370/335 |
| 2007/0248068 A1 | 10/2007 | Onggosanusi et al. | |
| 2008/0298524 A1* | 12/2008 | Koorapaty | H04L 27/2647 375/348 |
| 2010/0002582 A1* | 1/2010 | Luft | H04W 74/0866 370/230.1 |
| 2011/0110442 A1* | 5/2011 | Wu | H04L 5/0048 375/260 |
| 2016/0100373 A1* | 4/2016 | Chen | H04J 11/0069 370/350 |
| 2016/0157164 A1* | 6/2016 | Lee | H04W 24/02 370/329 |

FOREIGN PATENT DOCUMENTS

| | | |
|---|---|---|
| CN | 101394382 A | 3/2009 |
| CN | 101557371 A | 10/2009 |
| CN | 103560985 A | 2/2014 |
| CN | 105163328 A | 12/2015 |
| CN | 106385274 A | 2/2017 |
| EP | 2733878 A1 | 5/2014 |
| WO | 2015089715 A1 | 6/2015 |
| WO | 2015100939 A1 | 7/2015 |

OTHER PUBLICATIONS

Li et al., "Anchor-Booster Based Heterogeneous Networks with mmWave Capable Booster Cells," IEEE Globecom 2013 Workshop, pp. 93-98, Institute of Electrical and Electronics Engineers, New York, New York (Dec. 9-13, 2013).
Barati et al., "Directional Cell Discovery in Millimeter Wave Cellular Networks," IEEE Transactions on Wireless Communications, vol. 14, No. 12, pp. 6664-6678, Institute of Electrical and Electronics Engineers, New York, New York (Dec. 2015).
Barati et al., "Initial Access in Millimeter Wave Cellular Systems," IEEE Transactions on Wireless Communications, vol. 15, No. 12, pp. 7926-7940, Institute of Electrical and Electronics Engineers, New York, New York (Dec. 2016).
Giordani et al., "Comparative Analysis of Initial Access Techniques in 5G mmWave Cellular Networks," 2016 Annual Conference on Information Science and Systems, Princeton, New Jersey, pp. 1-6, Institute of Electrical and Electronics Engineers, New York, New York (Mar. 15-18, 2016).
Jeong et al., "Random Access in Millimeter-Wave Beamforming Cellular Networks: Issues and Approaches," IEEE Communications Magazine, pp. 180-185, Institute of Electrical and Electronics Engineers, New York, New York (Jan. 2015).
Han et al., "Efficient Preamble Design Technique for Millimeter-Wave Cellular Systems with Beamforming," Sensors 2016, vol. 16, No. 7, pp. 1129-1143, Institute of Electrical and Electronics Engineers, New York, New York (Jul. 21, 2016).
Shokri-Ghadikolaei et al., "Millimeter wave cellular networks: A MAC layer perspective," IEEE Transactions on Communications, vol. 63, No. 10, pp. 3437-3458, Institute of Electrical and Electronics Engineers, New York, New York (Oct. 2015).
Barati et al., "Directional Cell Search for Millimeter Wave Cellular Systems," 2014 IEEE 15th International Workshop on Signal Processing Advances in Wireless Communications (SPAWC), pp. 120-124, Institute of Electrical and Electronics Engineers, New York, New York (Jun. 2014).
Barati et al., "Directional initial access for millimeter wave cellular systems," 2015 49th Asilomar Conference on Signals, Systems and Computers, pp. 307-311, Institute of Electrical and Electronics Engineers, New York, New York (Nov. 2015).
Capone et al., "Context Information for Fast Cell Discovery in mm-wave 5G Networks," European Wireless 2015, pp. 400-405, 21th European Wireless Conference, Budapest, Hungary, (2015).
Abbas et al., "Context Information Based Initial Cell Search for Millimeter Wave 5G Cellular Networks," ArXiv 1605.01930, pp. 1-7, Princeton University, Princeton, NJ (May 2016).
Giordani et al., "Multi-Connectivity in 5G mmwave Cellular Networks," 2016 Mediterranean Ad Hoc Networking Workshop (Med-Hoc-Net), pp. 1-7, Institute of Electrical and Electronics Engineers, New York, New York (Jun. 20-22, 2016).
Alkhateeb et al., "Initial Beam Association in Millimeter Wave Cellular Systems: Analysis and Design Insights," in ArXiv 1602.06598, pp. 1-30, Princeton University, Princeton, NJ (Feb. 2016).
"On network beam switching and refinement," 3GPP TSG-RAN WG1 #86bis, Lisbon, Portugal, R1-1609515, pp. 1-7, 3rd Generation Partnership Project, Valbonne, France (Oct. 10-14, 2016).
"Access mechanism for beam based approach," 3GPP TSG RAN WG1#86, Gothenburg, Sweden, R1-166088, pp. 1-8, 3rd Generation Partnership Project, Valbonne, France (Aug. 22-26, 2016).
Giordani et al., "Initial Access in 5G mm-Wave Cellular Networks," ArXiv 1602.07731v2, pp. 1-8, Princeton University, Princeton, NJ (May 2016).
Abbas et al., "Towards an Appropriate Beamforming Scheme for Initial Cell Discovery in mmW 5G Cellular Networks," ArXiv 1605.00508, pp. 1-7, Princeton University, Princeton, NJ (May 2016).
Roessler, "Cell Search and Cell Selection in UMTS LTE," Application Note, pp. 1-40, Rohde and Schwarz, Munich, Germany (Sep. 2009).
Desai et al., "Initial Beamforming for mmWave Communications," 2014 48th Asilomar Conference on Signals, Systems and Computers, pp. 1926-1930, Institute of Electrical and Electronics Engineers, New York, New York (Nov. 2-5, 2014).
Li et al., "Design and Analysis of Initial Access in Millimeter Wave Cellular Networks," ArXiv1609.05582, pp. 1-32, Princeton University, Princeton, NJ (Mar. 2017).
"Network Functions Virtualisation (NFV); Use Cases", ETSI GS N FV 001 v1.1.1, pp. 1-50, European Telecommunications Standards Institute, Sophia Antipolis, France (Oct. 2013).
Ku et al., "Efficient Beam-Training Technique for Millimeter-Wave Cellular Communications," ETRI Journal, vol. 38, No. 1, pp. 81-89, Electronics and Telecommunications Research Institute, Daejeon, Korea (Feb. 2016).
"Multi-Beam Common Control Plane Design," 3GPP TSG-RAN WG1 #86bis, Lisbon, Portugal, R1-1610247, pp. 1-5, 3rd Generation Partnership Project, Valbonne, France (Oct. 10-14, 2016).
"NR Initial Access Procedure with multi-stage synchronization signals," 3GPP TSG RAN WG1 NR Ad hoc Meeting, Spokane, WA, R1-1700177, pp. 1-6, 3rd Generation Partnership Project, Valbonne, France (Jan. 16-20, 2017).
"On forming wide beams," 3GPP TSG-RAN WG1 #87ah-NR, Spokane, WA, R1-1700772, pp. 1-4, 3rd Generation Partnership Project, Valbonne, France (Jan. 16-20, 2017).

* cited by examiner

CELL SEARCH OF USER EQUIPMENT IN ACCORDANCE WITH CELL SEARCH SLOTS ASSOCIATED WITH GROUPS OF BASE STATIONS

CROSS-REFERENCE TO RELATED APPLICATIONS

This application is a continuation of International Application No. PCT/EP2017/068607, filed on Jul. 24, 2017, the disclosure of which is hereby incorporated by reference in its entirety.

TECHNICAL FIELD

Embodiments of the present disclosure relate to radio devices such as base stations and User Equipment (UE). In particular, the embodiments of the present disclosure relate to a base station and a UE operating in accordance with pilot slots associated with groups of base stations and a method for operating such a base station or such a UE. The embodiments of the present disclosure further relate to a time shifted training structure for Initial Access.

BACKGROUND

In mobile radio communication 100 as illustrated by FIG. 1, UEs 114 connect to a radio network via base stations 111, 112, 113. When a user equipment (UE) 114 wants to camp on a cell, i.e. connect to a BS, it needs to perform initial access. To this end, the UE 114 receives pilot signals transmitted simultaneously from the base stations (BSs) 111, 112, 113 and performs a cell search 115 based on the received pilot signals. The pilot signal transmitted by each (neighboring) cell is unique and is associated with the cell ID, enabling the UE to identify the best cell to camp on. In LTE (Long Term Evolution), for example, the primary synchronization signal and the secondary synchronization signal are transmitted by a BS in each cell and are used to determine one of the 504 available cell IDs.

With the deployment of small cells and ultra-dense networks, the required number of cell IDs for future communication networks is expected to increase significantly. This inevitably leads to an increase in the number of required pilot signals to identify each cell as well as an increase in the length of the pilot signals to distinguish different pilot signals. The need for more and longer pilot signals, however, leads to problems of increased overhead, in either time or frequency (i.e. bandwidth), increased delay, especially when considering intermittent links as in millimeter wave (mm-Wave) systems, and increased complexity, associated with distinguishing longer and more pilot signals.

The pilot signals can also be used by the UE for synchronization in the downlink. A pilot signal may therefore also be referred to as a synchronization signal.

The drawbacks of longer pilot signals become more pronounced at higher frequencies, e.g., in the mmWave domain. Contrary to current networks operating at lower frequencies, where the initial access is performed with omnidirectional transmission, directional transmission (beamformed transmission, with beamforming gain) is required for the initial access at higher frequencies. This is due to a non-trivial mismatch in the coverage area with an omnidirectional and a directional transmission, where the coverage area with directional transmission is larger due to the beamforming gain. Therefore, beam sweeping over all possible transmit beam combinations at BS (transmitter) 111, 112, 113 and UE (receiver) 114 may be needed during the cell search 115 not only to find the best cell but also to find the best transmit beam 101, 102, 103 between the BS 111, 112, 113 and UE 114. Since the pilot signal may need to be transmitted repeatedly for each trained transmit beam 101, 102, 103 as shown in FIG. 1, this accentuates the drawbacks resulting from longer pilot signals. The overhead with beam sweeping is further increased if the beam ID needs to be communicated also with each trained transmit beam.

SUMMARY

It is the object of the invention to provide an efficient technique for enabling a UE to identify a base station among a plurality of base stations, e.g., for an initial access procedure or for synchronizing the UE with the base station, in particular in radio communication using beamformed transmission. The technique should be efficient in the sense that overhead should be small, delay should be short and complexity should be low.

This object is achieved by the features of the independent claims. Further implementation forms are apparent from the dependent claims, the description and the figures.

A main idea of the invention can be seen in dividing the cells in a network into groups and operating the cells in a group to perform the synchronization/cell search at the same time. Moreover, the synchronization/cell search of the groups of cells can be shifted in time from one another, such that there is an easily detectable time shift relative to the cell search slots of other groups of cells. In one implementation, there is no overlap or only a minor overlap between the cell search slot of one group and the cell search slot of another group. By having the synchronization/cell search of each group of cells at different time shifts, the number of cells which simultaneously perform the cell search is reduced. The reduced number of cells which can perform the cell search at a given time, i.e. the number of cells in a given group, allows to reduce the number of pilot signals and the length of the pilot signals compared to a scheme in which all the cells perform the synchronization/cell search at the same time. This results from the fact that the number and length of the pilot signals depend on the number of cells which need to be distinguished at a time. The disclosed idea allows using the same set of pilot signals in each group of cells. In general, however, the reuse pattern of the pilot signals can be optimized across cells and time (time shifts), e.g., based on network planning. Hence, the disclosed idea allows for flexibility in the assignment of pilot signals across cells and time.

The cell search slots are also referred to herein as pilot slots. For the purpose of description in the present disclosure, the pilot slots of the synchronization period are assigned pilot slot indices 1 to N according to their temporal order, wherein N>2 is the total number of pilot slots in the synchronization period. Each pilot slot is thus uniquely identified by its index. The first (i.e. earliest) and the last (i.e. latest) pilot slot in the synchronization period have indices 1 and N, respectively. The pilot slot indices (which have been introduced here merely for the purpose of description) may also be used in an actual implementation, that is, in logical operations, computations, or signal processing performed by, e.g., the UE or the BS, or by other units of the network.

In order to describe the invention in detail, the following terms, abbreviations and notations will be used:

LTE: Long Term Evolution

BS: Base Station, for example access nodes, evolved NodeBs (eNBs), gNBs, NodeBs, master eNBs (MeNBs), secondary eNBs (SeNBs), remote radio heads and access points UE: User Equipment mmWave: millimeter wave, also known as microwaves, i.e. electromagnetic waves with wavelengths in a range of about 1 mm to 10 mm SIR: Signal to interference ratio Frame: the synchronization period Cell: a region served by a base station; the term "cell" may in some instances be used interchangeably with the term "base station".

According to a first aspect, the invention relates to a base station (BS) configured to operate in accordance with a periodically repeated synchronization period, wherein the synchronization period comprises a plurality of successive pilot slots, the pilot slots being associated with groups of base stations in a one-to-one relationship, wherein the base station is configured to be a member of a first group among the groups of base stations and to transmit, in each repetition of the synchronization period, one or more pilot signals in the pilot slot associated with the first group. In other words, each of the pilot slots is associated with precisely one of the groups, and vice versa.

Such a base station provides an efficient mechanism for synchronizing with a user equipment, in particular in radio communication using beamformed transmission. The BS improves the initial access procedure for a UE to camp on the BS by reducing overhead, delay and complexity.

By having the synchronization/cell search of each group of cells or BSs in different pilot slots (i.e. at different time shifts), the number of cells (or BSs) which simultaneously perform the cell search is reduced. The reduced number of cells which can perform the cell search at a given time, i.e. the number of cells in a given group, allows to reduce the number of pilot signals and the length of the pilot signals compared to the case when all the cells perform the synchronization/cell search at the same time. This results from the fact that the number and length of the pilot signals depend on the number of cells which need to be distinguished at a time. Hence, this technique allows to use the same set of pilot signals in each group of cells. The reuse pattern of the pilot signals can be further optimized across cells and time, e.g., based on network planning. Hence, the disclosed technique allows for flexibility in the assignment of pilot signals across cells and time.

In an exemplary implementation form of the base station, the base station is configured not to be a member of any other group among the groups of base stations.

This provides the advantage that the UE can determine the specific group of BSs from which the received radio signal was transmitted based on the timing of the pilot signal. As the UE knows which BSs are included in this group it can exclude other base stations not included in this group. Hence processing speed of the UE, in particular for the initial access procedure, can be improved.

In an exemplary implementation form of the base station, each of the one or more pilot signals comprises an identifier of the base station.

This provides the advantage that the UE can derive from the received pilot signal which base station has transmitted the pilot signal. Hence, the UE can improve the initial access procedure for camping on a BS by reducing overhead, delay and complexity. The identifier can be a certain bit sequence.

In an exemplary implementation form of the base station, the identifier of the base station is identical to an identifier in a pilot signal transmitted by a second base station which is a member of a second group among the groups of base stations.

This provides the advantage that the number of necessary base station identifiers can be reduced when discrimination of different base stations can be performed by evaluating the group membership.

In an exemplary implementation form of the base station, the plurality of pilot slots includes one or more pilot slots that each overlap partly with their respective predecessor.

This can provide the advantage that an initial access procedure at the UE is faster when pilot slots overlap partly with their predecessors as processing the respective pilot slot can start earlier in time.

In an exemplary implementation form of the base station, the plurality of pilot slots includes one or more pilot slots that each adjoin their respective predecessor or are separated from their respective predecessor by a respective time gap.

This provides the advantage that the pilot signals from base stations belonging to different groups can be distinguished from one another by their different timings.

In an exemplary implementation form, the base stations are partitioned into the groups of base stations based on a geographical distribution of the base stations.

This provides the advantage that a discrimination of the base stations can be performed by their geographical location. This further saves BS identifiers, as two BSs located at different geographical locations may use the same BS identifier. Hence, the number of different pilot signals can be reduced.

In an exemplary implementation form of the base station, the base station is configured in each repetition of the synchronization period to perform the transmission of the one or more pilot signals in the pilot slot associated with the first group by generating one or more beams, each of the one or more beams carrying one of the one or more pilot signals.

This provides the advantage that by using one or more beams, transmission performance can be improved. This enables beam sweeping over all possible transmit beam combinations at BS and UE during the cell search not only to find the best cell but also to find the best transmit beam between the BS and UE.

In an exemplary implementation form of the base station, the one or more pilot signals transmitted by the base station in the pilot slot associated with the first group comprise a plurality of successively transmitted pilot signals.

This provides the advantage of having multi-stage synchronization signals, which eases the detection complexity at the UE.

In an exemplary implementation form of the base station, pilot signals associated with a first group of radio signals are from a first set of pilot signals; and pilot signals associated with a second group of radio signals are: from a second set of pilot signals, or from the first set of pilot signals, or at least partially from the first set of pilot signals and/or at least partially from the second set of pilot signals.

This provides the advantage of high flexibility for assigning pilot signals.

In an exemplary implementation form of the base station, the synchronization period further comprises a no-pilot-transmission period that does not overlap with any of the pilot slots.

This provides the advantage that during this no-pilot-transmission period payload data or control data can be transmitted in order to improve the efficiency of transmission. It further gives the advantage of facilitating identification of the base station among the plurality of base stations based on the timing of the pilot signals transmitted by the base station.

In an exemplary implementation form of the base station, the base station is configured in each or in one or more repetitions of the synchronization period to transmit data before or after or both before and after transmitting the one or more pilot signals, using a same channel for transmitting the one or more pilot signals and for transmitting the data.

This provides the advantage of improving the efficiency of the data transmission.

According to a second aspect, the invention relates to a system comprising a plurality of base stations, wherein the system is arranged to operate in accordance with a periodically repeated synchronization period, wherein the synchronization period comprises a plurality of successive pilot slots associated with groups of base stations in a one-to-one relationship, wherein each base station among the plurality of base stations is configured to be a member of one of the groups of base stations and to transmit, in each repetition of the synchronization period, one or more pilot signals in the pilot slot associated with the group that includes the respective base station.

Such a system provides an efficient mechanism for synchronizing a user equipment with a base station, in particular in radio communication using beamformed transmission. In particular, the system improves the initial access procedure for a UE to camp on a BS by reducing overhead, delay and complexity.

By having the synchronization/cell search of each group of cells or BSs at different pilot slots, the number of cells/BSs which simultaneously perform the cell search is reduced. The reduced number of cells which can perform the cell search at a given time, i.e. the number of cells in a given group, allows to reduce the number of pilot signals and the length of the pilot signals compared to the case when all the cells perform the synchronization/cell search at the same time. This technique allows to use the same set of pilot signals in each group of cells. Hence, the disclosed technique allows for flexibility in the assignment of pilot signals across cells and time.

According to a third aspect, the invention relates to a user equipment, UE, arranged to operate in accordance with a periodically repeated synchronization period, wherein the synchronization period comprises a plurality of successive pilot slots associated with groups of base stations in a one-to-one relationship, wherein the UE is configured, in each of the pilot slots in each or in one or more repetitions of the synchronization period, to receive pilot signals from the group of base stations that is associated with the respective pilot slot.

Such a UE provides an efficient mechanism for synchronizing with a base station, in particular in radio communication using beamformed transmission. In particular, such a UE improves the initial access procedure for camping on a BS by reducing overhead, delay and complexity.

As described above, by having the synchronization/cell search of each group of cells or BSs at different pilot slots, the number of cells/BSs which simultaneously perform the cell search is reduced. The reduced number of cells which can perform the cell search at a given time, i.e. the number of cells in a given group, allows reducing the number of pilot signals and the length of the pilot signals compared to the case when all the cells perform the synchronization/cell search at the same time. This technique allows using the same set of pilot signals in each group of cells. Hence, the disclosed technique allows for flexibility in the assignment of pilot signals across cells and time.

In an exemplary implementation form of the UE, the UE is configured to identify or select a base station based on the received pilot signals.

This provides the advantage that the cell search procedure for searching an adequate radio cell can be improved.

In an exemplary implementation form of the UE, the UE is configured to identify or select the base station based on the pilot signal of the base station and a timing of the pilot slot in which the UE received the pilot signal.

This provides the advantage that by additionally exploiting the timing of the pilot slot improves the cell search procedure for searching an adequate radio cell as more information is available.

In an exemplary implementation form of the UE, the UE is configured to perform the identification or selection of the base station by extracting, from each of the received pilot signals, an identifier and determining an index of the pilot slot in which the UE received the respective pilot signal, the identifier and the index forming an identifier-index pair, and comparing the identifier-index pair against entries of a base station list.

This provides the advantage that the cell search procedure can be accelerated when evaluating the identifier-index pair.

According to a fourth aspect, the invention relates to a method of operating a base station in accordance with a periodically repeated synchronization period, wherein the synchronization period comprises a plurality of successive pilot slots, the pilot slots being associated with groups of base stations in a one-to-one relationship, wherein the method comprises: operating the base station as a member of a first group among the groups of base stations; and transmitting by the base station in each repetition of the synchronization period one or more pilot signals in the pilot slot associated with the first group.

Such a method provides an efficient mechanism for synchronizing a User Equipment with a base station, in particular in radio communication using beamformed transmission. In particular, the method improves the initial access procedure between UE and BS by reducing overhead, delay and complexity.

As described above, by having the synchronization/cell search of each group of cells or BSs at different pilot slots, the number of cells/BSs which simultaneously perform the cell search is reduced. The reduced number of cells which can perform the cell search at a given time, i.e. the number of cells in a given group, allows reducing the number of pilot signals and the length of the pilot signals compared to the case when all the cells perform the synchronization/cell search at the same time. This technique allows using the same set of pilot signals in each group of cells. Hence, the disclosed technique allows for flexibility in the assignment of pilot signals across cells and time.

According to a fifth aspect, the invention relates to a method of operating a plurality of base stations in accordance with a periodically repeated synchronization period, wherein the synchronization period comprises a plurality of successive pilot slots, the pilot slots being associated with groups of base stations in a one-to-one relationship, wherein the method comprises: operating each base station as a member of one of the groups of base stations; and transmitting by each base station in each repetition of the synchronization period one or more pilot signals in the pilot slot associated with the group that includes the respective base station.

Such a method provides an efficient mechanism for synchronizing a User Equipment with a base station, in particular in radio communication using beamformed transmission. In particular, the method improves the initial access procedure between UE and BS by reducing overhead, delay and complexity.

As described above, by having the synchronization/cell search of each group of cells or BSs at different pilot slots, the number of cells/BSs which simultaneously perform the cell search is reduced. The reduced number of cells which can perform the cell search at a given time, i.e. the number of cells in a given group, allows reducing the number of pilot signals and the length of the pilot signals compared to the case when all the cells perform the synchronization/cell search at the same time. This technique allows using the same set of pilot signals in each group of cells. Hence, the disclosed technique allows for flexibility in the assignment of pilot signals across cells and time.

BRIEF DESCRIPTION OF THE DRAWINGS

Further embodiments of the invention will be described with respect to the following figures, in which.

DETAILED DESCRIPTION OF THE EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may also be implemented in wireless communication networks based on mobile communication standards similar to, e.g., LTE, in particular 4.5G, 5G and beyond. The methods and devices described herein may also be implemented in wireless communication networks, in particular communication networks similar to WiFi communication standards according to IEEE 802.11. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz.

The devices and systems described herein may include processors, memories and transceivers, i.e. transmitters and/or receivers. In the following description, the term "processor" describes any device that can be utilized for processing specific tasks (or blocks or steps). A processor can be a single processor or a multi-core processor or can include a set of processors or can include means for processing. A processor can process software or firmware or applications etc.

In the following, base stations and User Equipment are described. Examples of a base station may include access nodes, evolved NodeBs (eNBs), gNBs, NodeBs, master eNBs (MeNBs), secondary eNBs (SeNBs), remote radio heads and access points.

Figure 2:
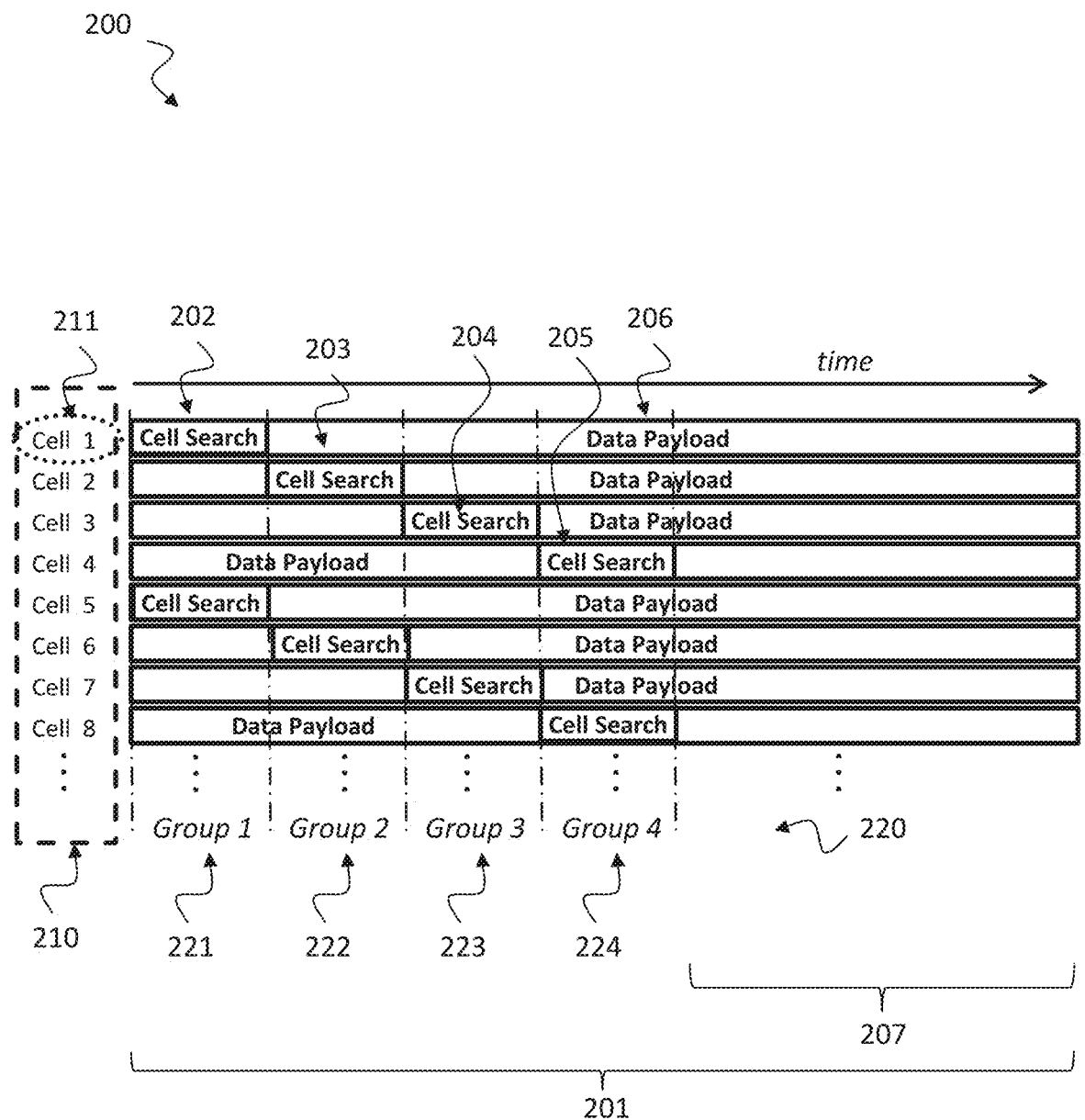
FIG. 2 shows a schematic diagram illustrating an exemplary time-shifted training structure 200 for synchronization/cell search with different groups 220 of cells performing the cell search at different time instances.

FIG. 2 shows a schematic diagram illustrating an exemplary time-shifted training structure 200 for synchronization/cell search with different groups 220 of cells performing the cell search at different time instances.

Instead of the simultaneous synchronization or cell search performed for the initial access as described above with respect to FIG. 1, a time shifted training scheme can be used, e.g., as shown in FIG. 2 for the synchronization or cell search 203, such that different groups 220 of cells perform the synchronization or cell search 202 at different time instances, e.g., as shown in the example of FIG. 2 where four pilot slots 202, 203, 204, 205 are considered. The cell search of the groups of cells 220 (in the example of FIG. 2 there are four groups 221, 222, 223, 224 of cells) are shifted in time from one another, such that there is no overlap (or a small overlap) with the cell search slots of other groups of cells. With such a structure, the number of cells performing the cell search at the same time is able to be reduced compared to the case when all cells perform the cell search simultaneously. Since a reduced number of cells need to be distinguished at a given time with the disclosed approach, this enables to reduce the number of pilot signals as well as the length of the pilot signals compared to when all cells perform the cell search at the same time.

In the example of FIG. 2, four groups 221, 222, 223, 224 (group 1, 221 consists of cells 1,5 . . . ; group 2, 222 of cells 2,6, . . . ; group 3, 223 of cells 3,7, . . . ; and group 4, 224 of cells 4,8, . . . ) perform the cell search at four different time instances, such that only ¼ of the cells perform the cell search at the same time, potentially allowing a reduction in the number and the length of the pilot signals by a factor of 4. The reduction in the number and the length of the pilot signals enabled with the time shifted training structure translates into the following benefits: Reduced overhead, by avoiding the use of longer pilot signals; reduced delay, due to shorter pilot signals and the time shifted structure; and reduced complexity, due to detecting less and shorter pilot signals.

In principle, by having more pilot slots, i.e. groups 220 of cells as shown in FIG. 2, a smaller number of cells may perform the cell search at the same time, thus, allowing a larger reduction in overhead, complexity and delay. In general, however, the number of groups 220 (or pilot slots) can be optimized depending for instance on the network deployment and system parameters. Furthermore, the assignment of the cells into the groups 220 (i.e. when a cell performs the cell search) and the reuse/allocation of the pilot signals to the cells and groups can also be optimized across cells and time, e.g., based on network planning. Thus, the disclosed approach provides a general flexibility in the assignment of pilot signals across cells and time.

In addition, the transmit power of the pilot signal may be boosted to aid the cell search procedure as described in the following. Moreover, the disclosed time shifted training structure 200 can be performed for lower frequency systems as well as for high frequency systems, e.g., mmWave systems employing beam sweeping.

The reduced overhead and complexity offered by the disclosed scheme comes at the expense of inter cell interference on the cell search phase. For example, when cell 2 is performing the cell search procedure (see FIG. 2), it experiences interference generated by the data transmission in adjacent cells, i.e. cell 1, 3, 4, 5, 7, 8, etc. To address this inter cell interference on the cell search, the pilot signals (e.g., transmit power, length, type of sequence, etc.) can be optimized by taking this interference into account. For instance, to increase the success probability of cell detection, which effectively means mitigating the inter cell interference, the signal to interference ratio (SIR) and/or the length of the pilot signal can be increased as shown in a simple example depicted in FIG. 3.

The time-shifted training structure 200 for synchronization/cell search with different groups 220 of cells performing the cell search at different time instances can be implemented in a base station or a user equipment, e.g., one or more of the base stations 111, 112, 113 and the User Equipment 114 shown in FIG. 1, or a system of bases stations and User Equipment as described in the following.

A base station according to the disclosure is configured to operate in accordance with a periodically repeated synchronization period 201, e.g., a time period 201 as shown in FIG. 2. The synchronization period 201 comprises a plurality of successive pilot slots 202, 203, 204, 205 denoted herein as cell search slots. In FIG. 2 an exemplary number of four pilot slots 202, 203, 204, 205 are depicted. Each pilot slot 202, 203, 204, 205 is a period within the synchronization period 201, "successive" means that they are time-shifted relative to each other. The pilot slots 202, 203, 204, 205 are associated with groups 220 of base stations in a one-to-one relationship. Each group 221, 222, 223, 224 of the groups 220 is thus associated with precisely one of the pilot slots 202, 203, 204, 205 and vice versa, i.e. each of the pilot slots 202, 203, 204, 205 is associated with precisely one of the groups 221, 222, 223, 224. For example, pilot slot #1, 202 is associated with group #1, 221; pilot slot #2, 203 is associated with group #2, 222; pilot slot #3, 204 is associated with group #3, 223; and pilot slot #4, 205 is associated with group #4, 224 as shown in the example of FIG. 2.

The base station is configured to be a member of a first group (e.g., group #1, 221) among the groups 220 of base stations and to transmit, in each repetition of the synchronization period 201, one or more pilot signals in the pilot slot 202 associated with the first group 221. That means, each pilot slot is allowed explicitly to accommodate one or more pilot signals of the same base station. This includes the embodiment where the base station sends several beams in the pilot slot, each beam carrying some identification of the base station and possibly of the beam, i.e. each beam carries a respective pilot signal of the base station and possibly of the beam.

The respective pilot period of the radio signal is transmitted simultaneously with the corresponding pilot periods of the other radio cells. This means with respect to the example of FIG. 2: pilot slot #1, 202 of cell #1, 211 is transmitted simultaneously with other pilot slots in group #1, 221, i.e. pilot slot #1 of cell #5; pilot slot #2, 203 of cell #2 is transmitted simultaneously with other pilot slots in group #2, 222, i.e. pilot slot #2 of cell #6; pilot slot #3, 204 of cell 3 is transmitted simultaneously with other pilot slots in group #3, 223, i.e. pilot slot #3 of cell #7; and pilot slot #4, 205 of cell #4 is transmitted simultaneously with other pilot slots in group #4, 224, i.e. pilot slot #4 of cell #8. In each pilot slot a respective pilot signal is transmitted.

The base station is configured not to be a member of any other group among the groups of base stations. I.e. a BS which is a member of group #1, 221 shall not be a member of the other groups #2, 222, #3, 223 and #4, 224 according to the example shown in FIG. 2.

Each of the one or more pilot signals comprises an identifier of the base station. The identifier may correspond to a cell ID, e.g., to enable a UE to determine a cell ID associated with the base station based on the identifier. Besides the cell ID, a beam ID may also be sent with each pilot signal, i.e. to identify the beam sent from a given BS.

The identifier of the base station may be identical to an identifier in a pilot signal transmitted by a second base station which is a member of a second group, e.g., group #2, 222 shown in FIG. 2, among the groups 220 of base stations. It is understood that the second group 222 is different from the first group 221.

The plurality of pilot slots 202, 203, 204, 205 may include one or more pilot slots that each overlap partly with their respective predecessor. The predecessor is the pilot slot preceding the respective pilot slot in the synchronization period, for example for pilot slot 203, the predecessor is pilot slot 202; for pilot slot 204, the predecessor is pilot slot 203; etc.

The plurality of pilot slots 202, 203, 204, 205 may include one or more pilot slots that each adjoin (as shown in the example of FIG. 2) their respective predecessor or are separated from (not shown in FIG. 2) their respective predecessor by a respective time gap.

In one embodiment, pilot signals of radio signals from a first group of radio signals may be from a first set of pilot signals; and pilot signals of radio signals from a second group of radio signals may be: from a second set of pilot signals, or from the first set of pilot signals, or at least partially from the first set of pilot signals and/or at least partially from the second set of pilot signals. At least one pilot signal from the first group of radio signals may correspond to at least one pilot signal from the second group of radio signals. The first group of radio signals and the second group of radio signals may include a different number of pilot signals.

In one implementation, the base stations may be partitioned into the groups 220 of base stations based on a geographical distribution of the base stations.

Figure 1:
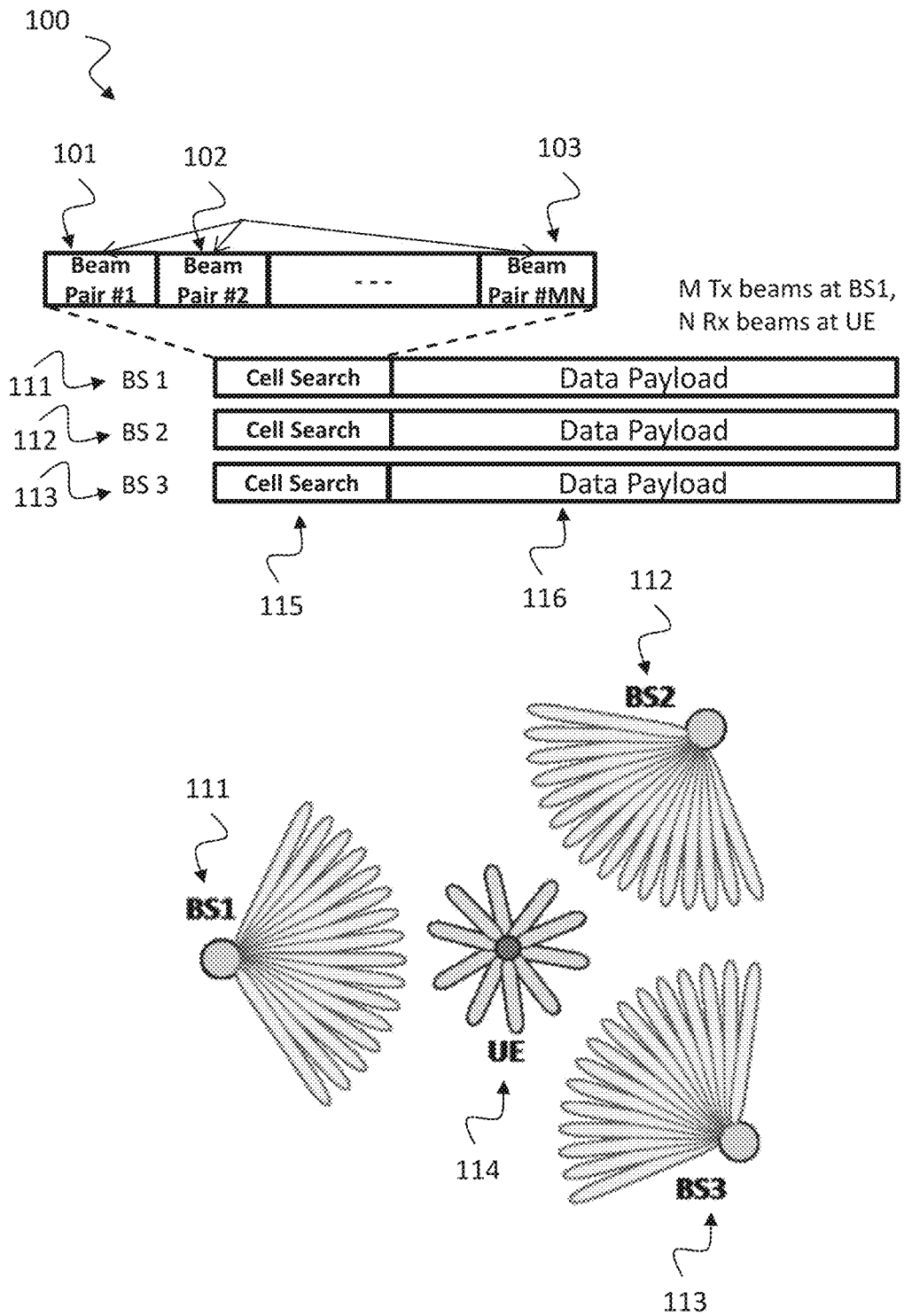
FIG. 1 shows a schematic diagram of a mobile radio communication system 100 illustrating the scenario of simultaneous synchronization/cell search with beam sweeping.

The base station may be configured in each repetition of the synchronization period 201 to perform the transmission of the one or more pilot signals in the pilot slot 202 associated with the first group 221 by generating one or more beams, e.g., beams as shown in FIG. 1, each of the one or more beams carrying one of the one or more pilot signals.

The one or more pilot signals may be transmitted by the base station in the pilot slot 202 associated with the first group 221 may comprise a plurality of successively transmitted pilot signals.

The division of radio signals into groups of radio signals may be based on a predefined mapping of radio cells into cell groups. The synchronization period may further comprise a no-pilot-transmission period 207 that does not overlap with any of the pilot slots 202, 203, 204, 205.

The base station may be configured in each or in one or more repetitions of the synchronization period 201 to transmit data, e.g., payload data 206 as shown in FIG. 2, before or after or both before and after transmitting the one or more pilot signals, using a same channel for transmitting the one or more pilot signals and for transmitting the data.

The time-shifted training structure 200 for synchronization/cell search with different groups 220 of cells performing the cell search at different time instances can be implemented in a system including a plurality of base stations 111, 112, 113 and one or more User Equipment 114, e.g., as depicted in FIG. 1, as described in the following.

Such a system is arranged to operate in accordance with a periodically repeated synchronization period 201, wherein the synchronization period 201 comprises a plurality of successive pilot slots 202, 203, 204, 205 associated with groups 220 of base stations in a one-to-one relationship. Each base station among the plurality of base stations is configured to be a member of one of the groups 220 of base stations and to transmit, in each repetition of the synchronization period 201, one or more pilot signals in the pilot slot 202, 203, 204, 205 associated with the group 221, 222, 223, 224 that includes the respective base station.

The time-shifted training structure 200 for synchronization/cell search with different groups 220 of cells performing the cell search at different time instances can be implemented in a User Equipment, e.g., a UE 114 as depicted in FIG. 1, as described in the following.

The user equipment, UE, is arranged to operate in accordance with a periodically repeated synchronization period 201, wherein the synchronization period comprises a plurality of successive pilot slots 202, 203, 204, 205 associated with groups 220 of base stations in a one-to-one relationship. The UE is configured, in each of the pilot slots 202, 203, 204, 205 in each or in one or more repetitions of the synchronization period 201, to receive pilot signals from the group (e.g., group #1, 221) of base stations that is associated with the respective pilot slot (e.g., pilot slot 202).

The UE may be configured to identify and/or select a base station based on the received pilot signals. That means, the UE can first identify the respective base station and then select the base station previously identified for camping on. Selecting may be defined as sending a connection request to the selected base station.

In one example, the UE may be configured to identify and/or select the base station based on the pilot signal of the base station and a timing of the pilot slot in which the UE received the pilot signal.

Note that in a certain embodiment it is possible to identify the base station based solely on the pilot signal, i.e. without needing the timing of the pilot slot.

The UE may be configured to perform the identification and/or selection of the base station by extracting, from each of the received pilot signals, an identifier and determining an index of the pilot slot in which the UE received the respective pilot signal, wherein the identifier and the index are forming an identifier-index pair, and comparing the identifier-index pair against entries of a base station list. The UE can determine the index of the pilot slot based on the timing of the pilot slot, e.g., relative to a network clock or relative to pilots received in other pilot slots of the same synchronization period. For example, correlation can be employed to extract the identifier of the base station from the received pilot signal, e.g., by correlating the received pilot signal with a known pilot sequence.

Figure 19:
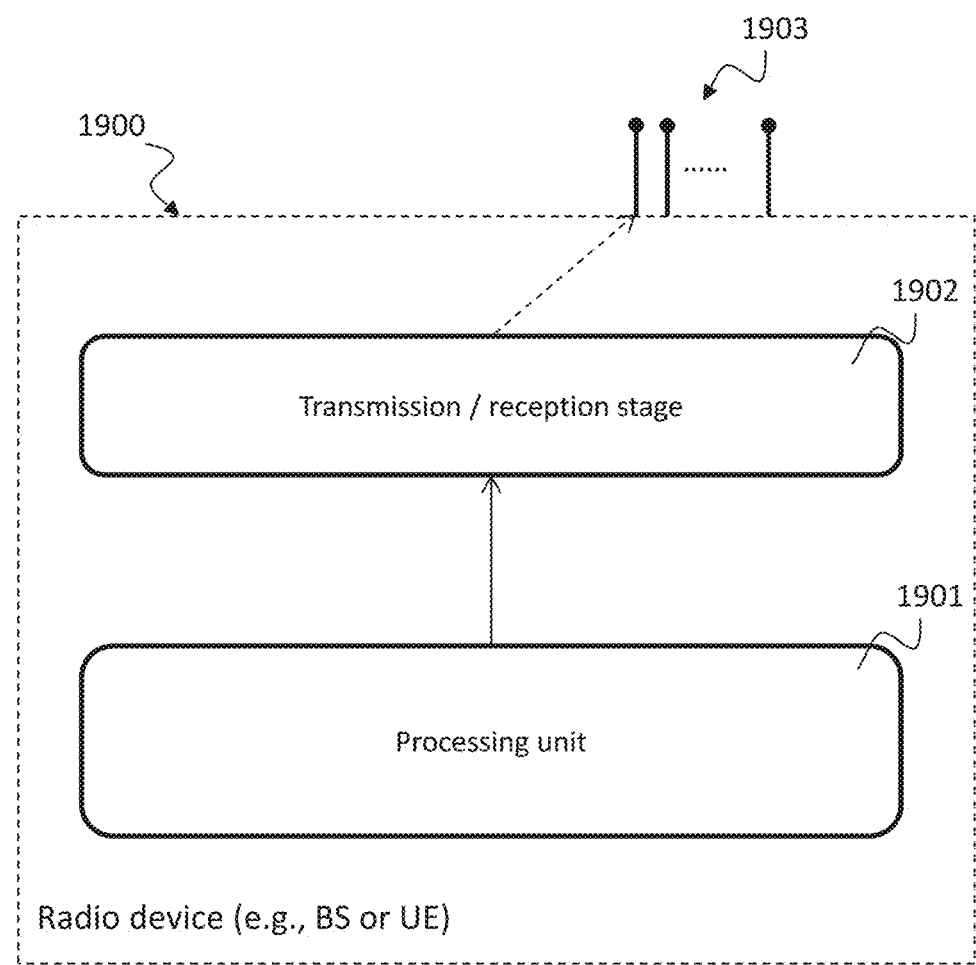
FIG. 19 shows a schematic diagram of a radio device 1900, e.g., a base station or a User Equipment according to the disclosure.

The base station may comprise a processing unit configured to perform the various data and signal processing operations. The BS may further comprise a transmission/reception stage controlled by the processing unit and connected or connectable to an antenna or to an antenna array, e.g., as shown in FIG. 19 describing the general structure of a radio device 1900.

Similar to the base station, also the UE, e.g., a UE 114 as shown in FIG. 1, may comprise a processing unit configured to perform the various data and signal processing operations. The UE may further comprise a transmission/reception stage controlled by the processing unit and connected or connectable to an antenna or to an antenna array, e.g., as shown in FIG. 19 describing the general structure of a radio device 1900.

Figure 3:
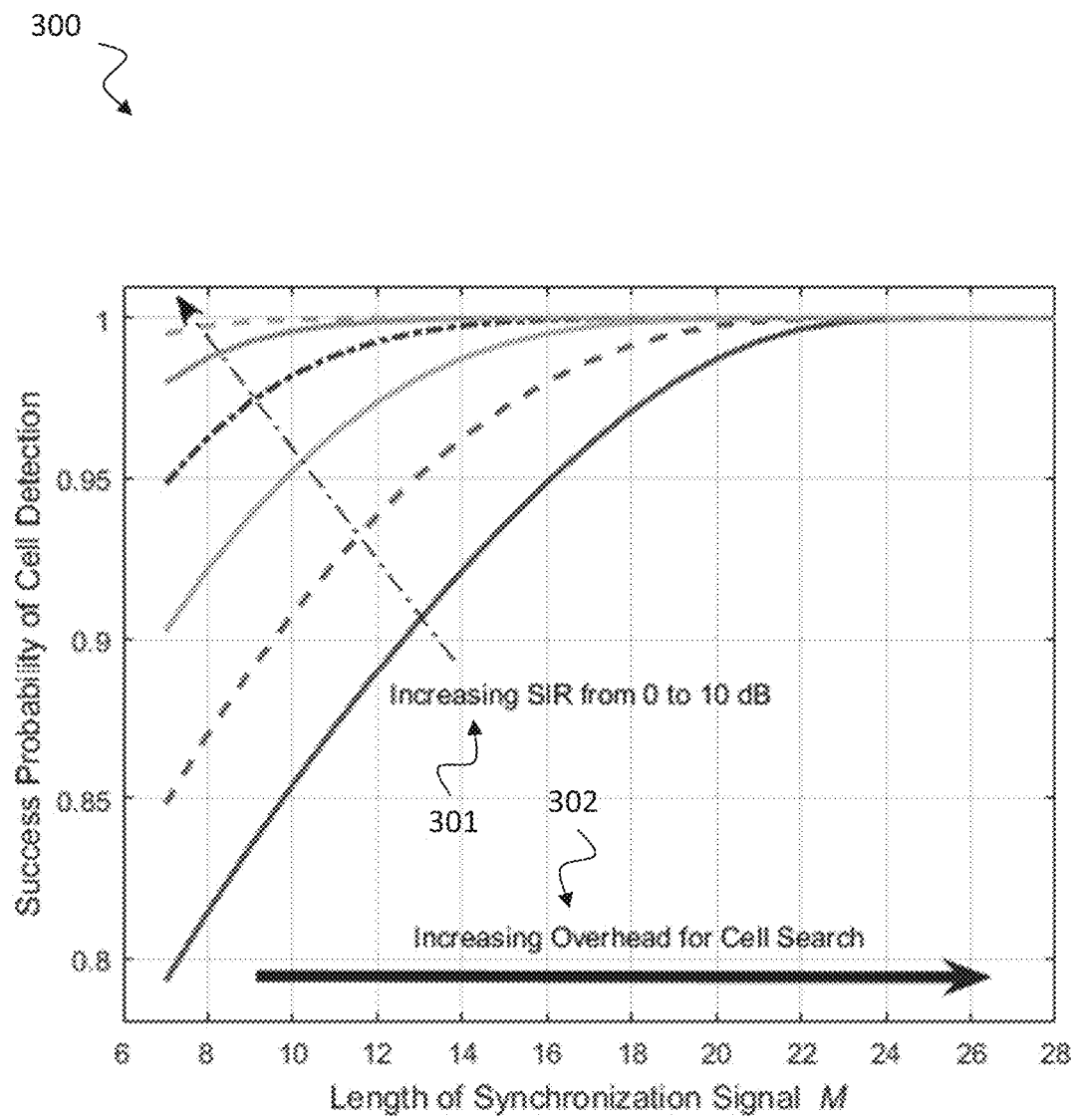
FIG. 3 shows a performance diagram 300 illustrating an exemplary success probability of cell detection.

FIG. 3 shows a performance diagram 300 illustrating an exemplary success probability of cell detection. Different graphs with signal to interference radio (SIR) from 0 to 10 dB are depicted.

The SIR can be increased 301 as shown in FIG. 3 by increasing the transmit power (boosting) of the pilot signal. On the other hand, the inter cell interference can be substantially reduced in certain scenarios, like in mmWave systems due to the directional transmissions required for mmWave communication. Since the directional transmissions for the data transmission in neighboring cells at mmWave effectively increases the SIR, the disclosed concept benefits from the reduced interference in mmWave networks.

As depicted in FIG. 3, the performance of the cell search procedure can also be improved by increasing the length of the synchronization signal, i.e. the overhead 302 for cell search, which results in a larger spreading gain, allowing averaging out better the inter cell interference. Although the disclosed approach is directed to reduce the length of the pilot signals, in order to reduce overhead and complexity, the optimum reduction depends on the deployment. For example, as discussed above with respect to FIG. 2, the length of the pilot signals with the disclosed scheme may be reduced by a factor of 4 with respect to the length of the pilot signals with a simultaneous cell search. However, the length of pilot signals can be reduced by using the disclosed scheme, for example, by a factor of 2 (instead of by 4), in order to still achieve a reduced overhead in the cell search procedure compared to the prior art, as well as to mitigate the inter cell interference. However, in the previous example of FIG. 2, the required number of pilot signals in each group can still be reduced by a factor of 4 (leading to reduced complexity by up to a factor of 4), since only ¼ of the cells perform the cell search at the same time.

Figure 4:
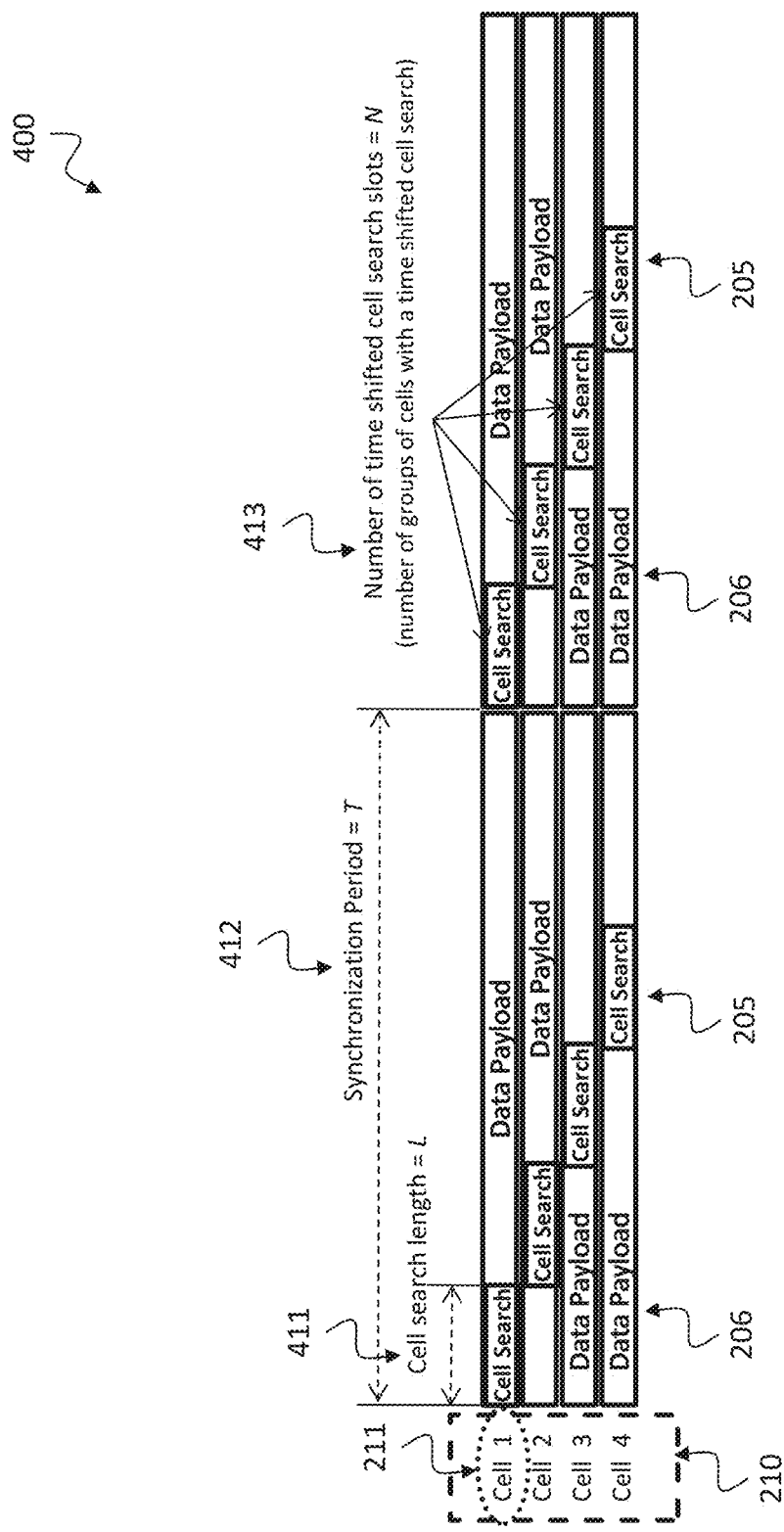
FIG. 4 shows a schematic diagram illustrating a time-shifted training structure 400 for initial access according to the disclosure.

FIG. 4 shows a schematic diagram illustrating a time-shifted training structure 400 for initial access according to the disclosure. The training structure 400 may correspond to the time-shifted training structure 200 shown in FIG. 2 repeated in time. In FIG. 4, only the first four cells are depicted while for FIG. 2, the first eight cells are depicted.

Figure 5:
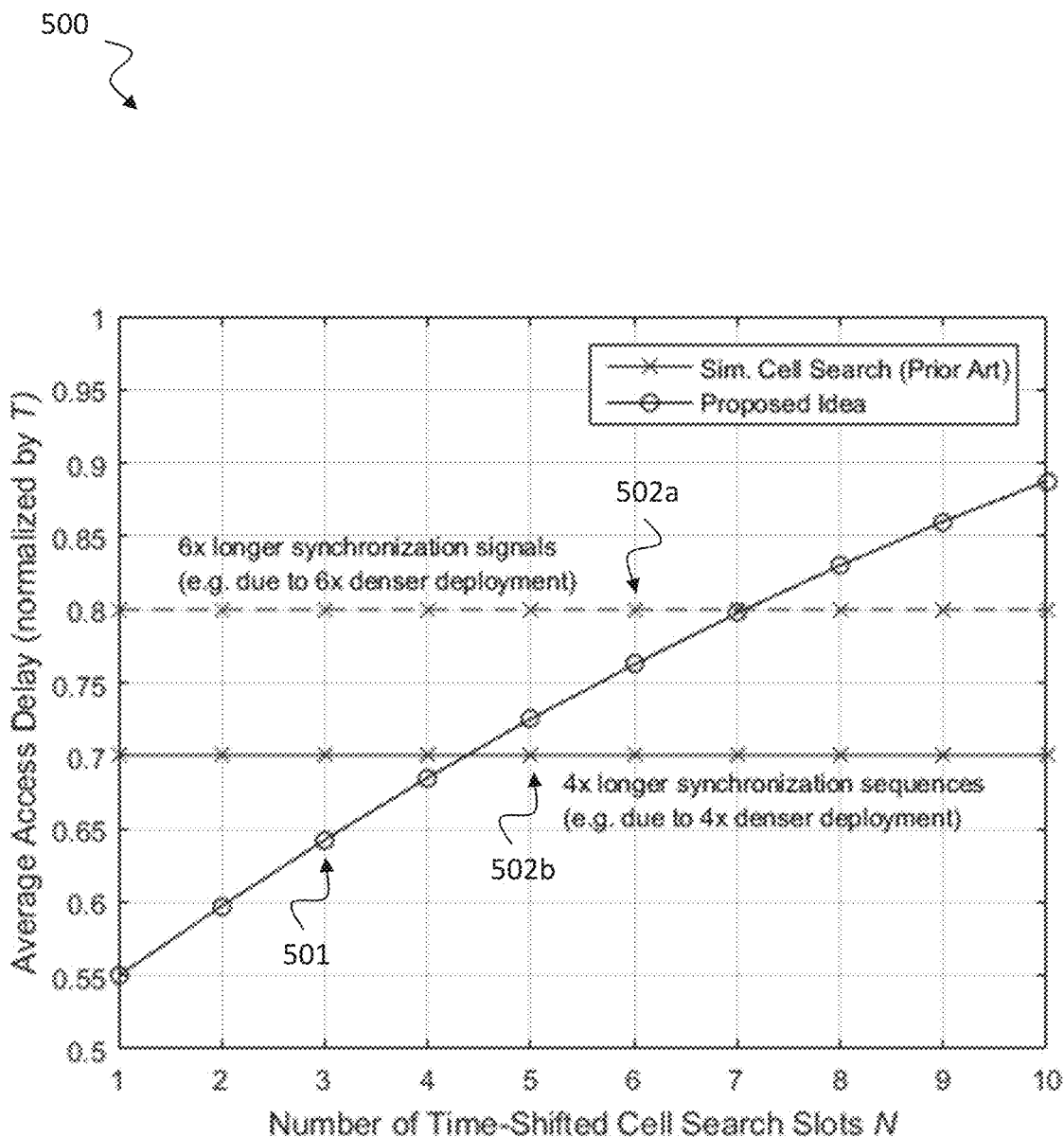
FIG. 5 shows a performance diagram 500 illustrating an exemplary average access delay versus number of pilot slots.

The disclosed approach is able to reduce the delay for initial access and re-access as discussed below. Assume the time when a UE starts the initial access is uniformly distributed over the frame, and denote the period 412 of the pilot signals (length of the frame) as T, the duration 411 of the cell search as L and the number 413 of pilot slots with the disclosed idea as N, as depicted in FIG. 4. In addition, denote the duration of the cell search with a simultaneous cell search (not shown in FIG. 4) as P. Since the length of the pilot signal can be reduced with the disclosed idea, the duration of the cell search is reduced, i.e. L<P. Consider for example a possible reduction of the pilot signals by a factor of 4 as discussed previously, i.e. the length of the pilot signals with the simultaneous cell search is 4× longer than with the disclosed approach, then P=4×L. For this case, the disclosed idea is able to reduce the average access delay when considering up to N=4 groups of cells as shown in FIG. 5, i.e. with up to N=4 pilot slots. With a reduction of the pilot signals' length by a factor of 6 compared to the prior art (simultaneous pilot signals), the average access delay can be reduced if up to N=7 cell search slots are considered.

For higher energy efficiency or to extend UE battery life, UEs do not always track other cells (constantly perform the cell search) once they have camped on a cell. Thus, in case of a handover or sudden blockage, the UEs need to perform the cell search again. Even if a UE tracks other cells, previous measurements may not be reliable after a blockage especially in mmWave systems. The disclosed idea also reduces the delay for initial re-access, assuming the UE camps on the first cell it finds with a sufficient link quality, i.e. for ultra-reliable and low latency applications. Due to the time shifted training structure for the initial access, the UE may start with the cell search immediately after the blockage without waiting for the beginning of the next frame when the cell search is assumed to take place according to the prior art. This results from the possibility of having always some cells performing the cell search at each time instance. For example, if a UE in cell 1 suffers a blockage/link failure during the time when cell 2 is performing the cell search, the UE can wait for the beginning of the next frame for the re-access. With the disclosed idea, the UE can immediately begin with the cell search after the blockage, such that that by the end of the frame where the blockage occurred, it can have already performed the cell search for cells 3 and 4 in the example of FIG. 4, and thus can camp on a new cell by then. Assuming the blockage event is uniformly distributed over the frame and that the best cell after blockage is uniformly distributed, FIG. 6 depicts the average delay for the initial re-access which decreases with the number of pilot slots, since there are more chances to camp on a cell with the disclosed idea.

Although the inter cell interference can be reduced with directional transmission in mmWave networks, in some scenarios, e.g., when a UE has a line of sight to two base stations, the use of the directional transmission may lead to a high interference if the interfering base station is transmitting with a beam pointing towards a UE in another cell. In this case, not considering the inter cell interference in the cell search may lead to not selecting the best cell or transmit beam for mmWave systems. Hence, interference-aware cell search may be relevant in this case. When performing the beam sweeping with a simultaneous cell search (according to prior art), the experienced interference for each trained beam is constantly changing depending on the transmit beams currently being scanned in the neighboring cells. Hence, this interference is not representative (uncorrelated) of the true interference resulting from the data transmission in neighboring cells. Although the SINR for all transmit beam configurations may be determined with the simultaneous cell search, the UEs are unaware of the transmit beams employed by neighboring BSs for the data transmission. With the time shifted structure of the cell search according to the disclosure, however, cell selection and the choice of transmit beams may be based on true interference generated with transmit beams employed for the data transmission in neighboring cells, allowing for interference sensing to some extent, when selecting the best cell and transmit beam.

FIG. 5 shows a performance diagram 500 illustrating average access delay versus number of pilot slots. Graph 501 illustrates the disclosed scheme while graphs 502a and 502b illustrates simulated cell search according to prior art, where graph 502a illustrates six times longer pilot signals and graph 502b illustrates four times longer synchronization sequences. FIG. 5 shows that the disclosed idea 501 can reduce the average access delay when considering up to N=4 groups of cells, i.e. with up to N=4 pilot slots. With a reduction of the pilot signals' length by a factor of 6 compared to the prior art (simultaneous pilot signals), the average access delay can be reduced if up to N=7 cell search slots are considered.

Figure 6:
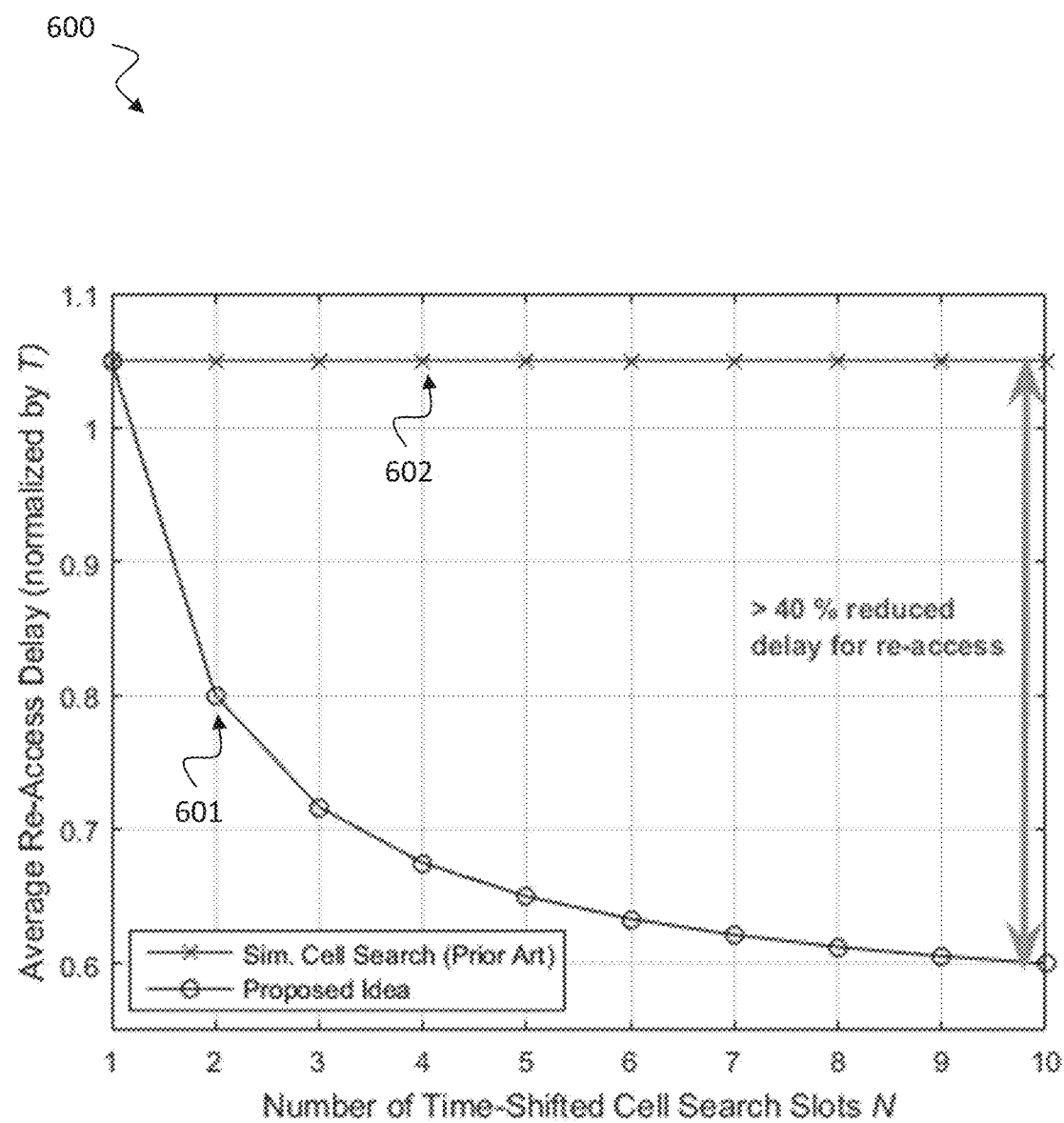
FIG. 6 shows a performance diagram 600 illustrating an exemplary average re-access delay versus number of pilot slots.

FIG. 6 shows a performance diagram 600 illustrating average re-access delay versus number of pilot slots. Graph 601 illustrates the disclosed scheme while graph 602 illustrates simulated cell search according to prior art. FIG. 6 shows the average delay for the initial re-access which decreases with the number of pilot slots, since there are more chances to camp on a cell with the disclosed idea.

Figure 7:
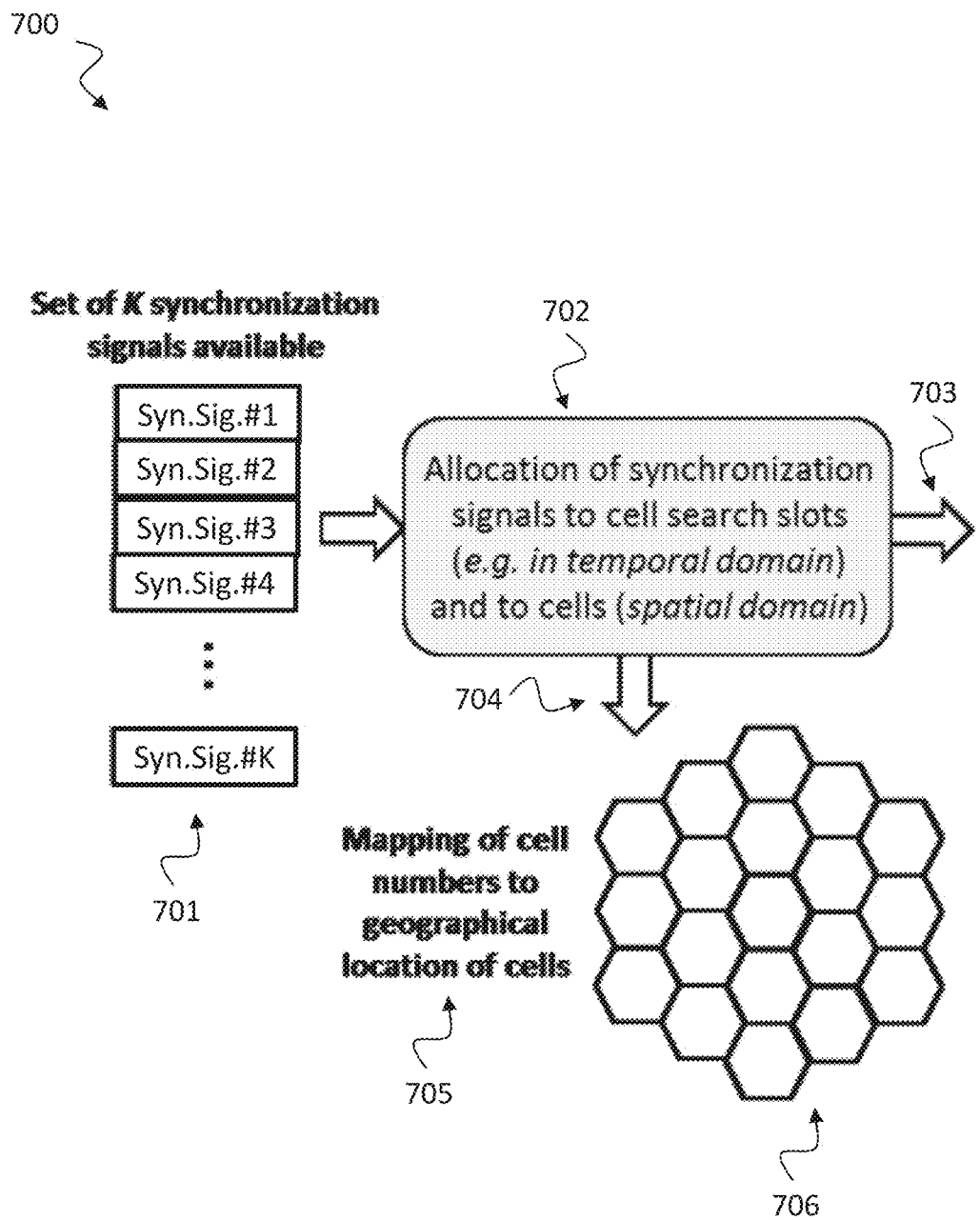
FIG. 7 shows a schematic diagram 700 illustrating an exemplary allocation 702 of pilot signals to cells.
Figure 8:
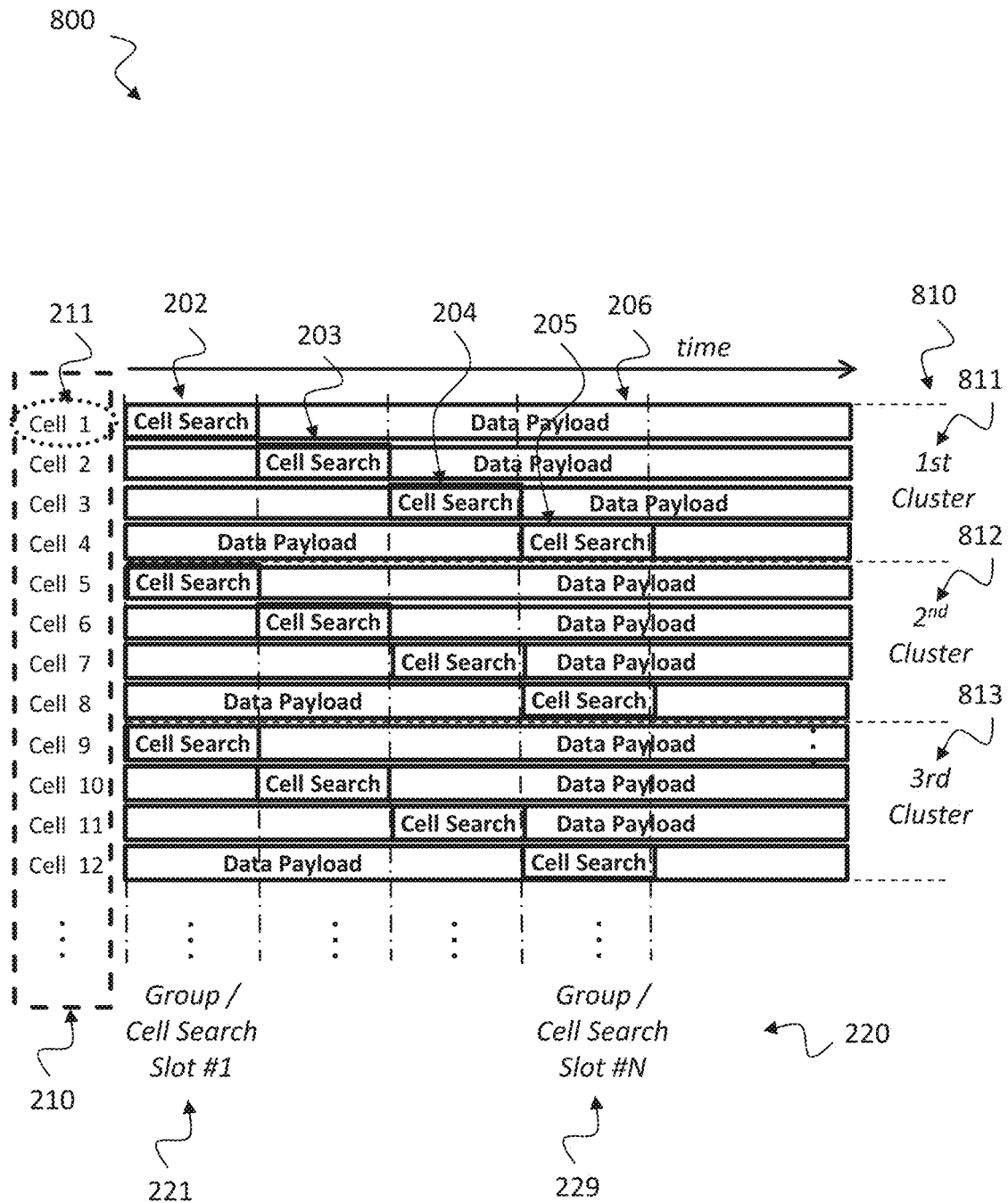
FIG. 8 shows a schematic diagram illustrating an exemplary assignment 800 of pilot signals.

FIG. 7 shows a schematic diagram 700 illustrating an exemplary allocation 702 of pilot signals to cells. FIG. 7 illustrates the key design principles of the disclosed approach which are: Time-shifted synchronization/cell search structure (see the set of K pilot signals 701) and reuse pattern of the pilot signals across cells and time (see the cell cluster 706). The pilot signals 701 are allocated 702 to cell search slots 703 (e.g., in temporal domain), for example as shown in FIG. 8, and to cells 704 (e.g., in spatial domain). Cell numbers may be mapped 705 to geographical location of cells, e.g., geographical location of cells in the cell cluster 706 shown in FIG. 7.

Cells are divided into groups, where the cells in each group perform the cell search at the same time. The synchronization/cell search of the groups are shifted in time, e.g., as shown in FIG. 8, such that there is no overlap (or a small overlap) with the cell search slots of other groups of cells.

The pilot signals may be distributed among the groups or cell search slots, such that (i) the same set of pilot signals can be used for each group of cells (or equivalently at each cell search slot), (ii) the pilot signals can be partially reused among the groups of cells (or over the cell search slots), or (iii) a distinct set of pilot signals can be used for each of group of cells (or at each cell search slot), e.g., as illustrated in FIG. 8. The assignment of the pilot signals to the cells can be such that neighboring cells employ distinct signals or use the same pilot signal.

Given these design principles, the disclosed concept allows to flexibly assign a set of pilot signals to the shifted cell search slots (i.e. over time and/or frequency) and to the cells (i.e. over space, geographical locations) as shown in FIG. 7. The allocation may depend on the number of available pilot signals (denoted by K in FIG. 7), on the number of pilot signals employed for each group or at cell search slot (denoted by Jn for group n), on the number of shifted cell search slots (denoted by/V) and on the network deployment. As discussed before, the shift can be in time and/or frequency. In the following examples the shifts are assumed to be in time. Furthermore, having different number of pilot signals per group allows some flexibility, but in the following examples it is assumed that each group of cells has the same number of pilot signals which are denoted by J, i.e. Jn=J. Note that these assumptions are only used to simplify the description without limiting the scope of the disclosed concept.

FIG. 8 shows a schematic diagram illustrating an exemplary assignment 800 of pilot signals. The allocation 702 of the pilot signals 701 to the cells 706 described in FIG. 7 can be done, for example, as follows as shown in FIG. 8. First, the cells in the network are divided into N groups 220, each group 221, 229 performing the cell search at one of the different pilot slots 202, 203, 204, 205. Second, the J pilot signals for each group 221, 229 need to be selected out of the available K pilot signals 701. Finally, the J pilot signals in each group 221, 229 are allocated to the cells in each group. Each step described before depends on the other steps, so basically the described steps should be performed jointly. Note that in case of N=1, the disclosed approach basically becomes the simultaneous cell search performed in conventional systems, such that the available K pilot signals need to be allocated to the cells in the network as done for example with current network planning. Assuming for example 28 cells in a network with K=7 available pilot signals 701 (Syn. Sig. #1, #2, #3, #4, #5, #6, #7), N=4 pilot slots 202, 203, 204, 205 and J=7 pilot signals per group 221, 229, a possible allocation of the pilot signals based on FIG. 8 is depicted in FIG. 10, where the mapping of the cell number to the geographical location of the cells is shown in FIG. 9.

Figure 9:
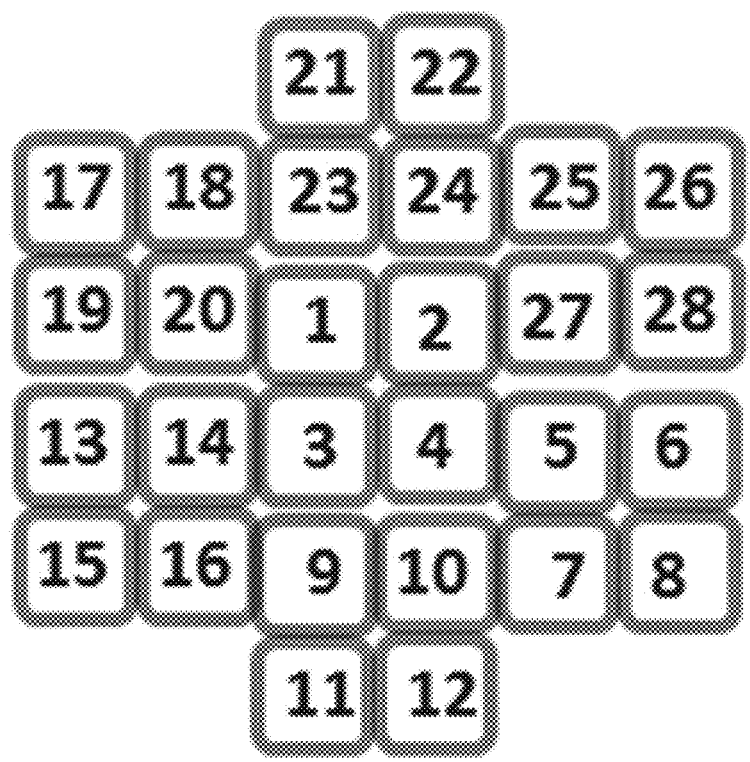
FIG. 9 shows a schematic diagram 900 illustrating an exemplary mapping of cell numbers to geographical location of the cells.
Figure 10:
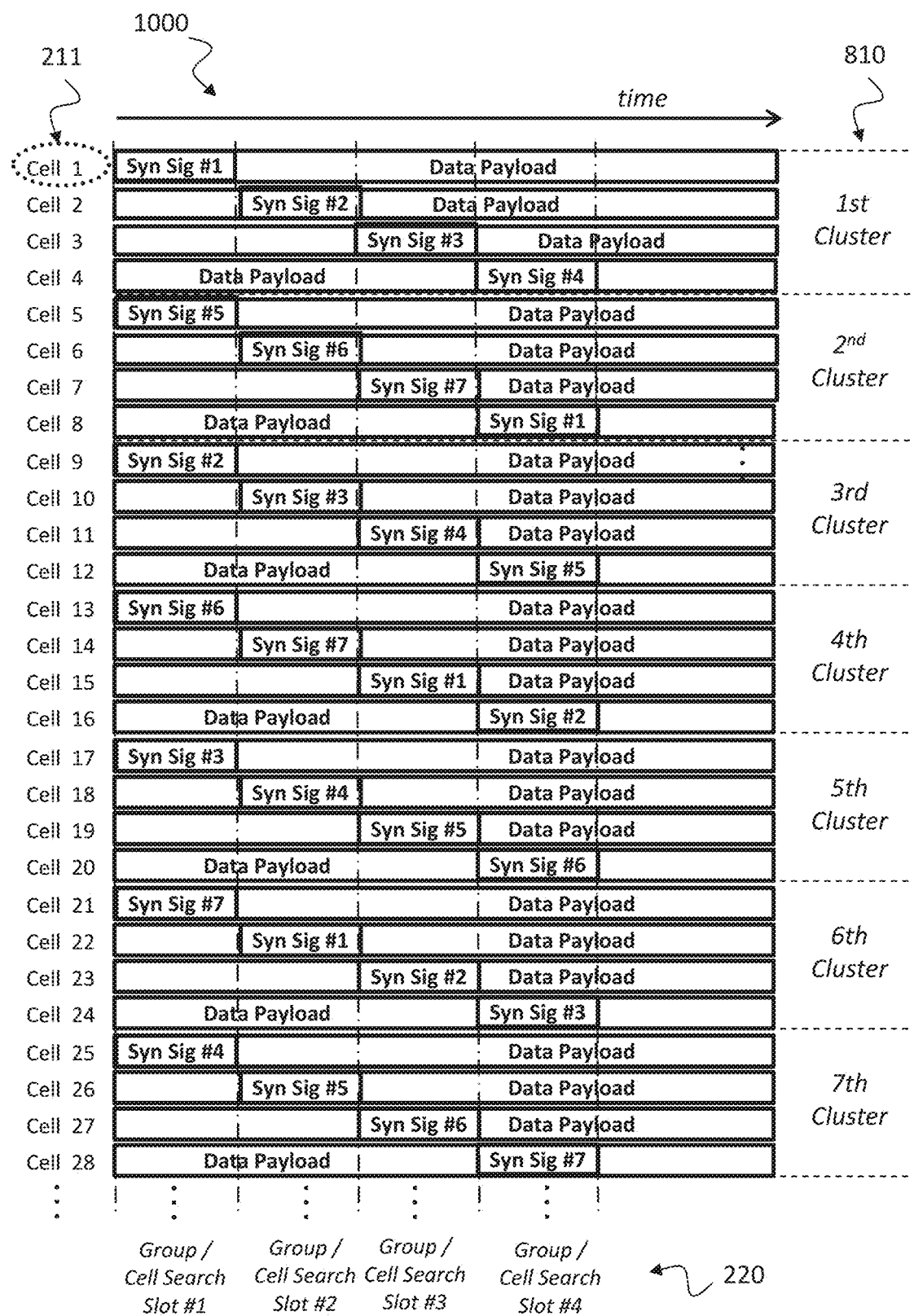
FIG. 10 shows a schematic diagram 1000 illustrating allocation of pilot signals to cell search slots according to a first embodiment.

FIG. 9 shows a schematic diagram 900 illustrating an exemplary mapping of cell numbers to geographical location of the cells.

Before proceeding, it is convenient to define a cluster 706 which is introduced in FIG. 7 and defined as a set of N cells which perform the cell search at different time slots, i.e. each cell in a cluster belongs to a different group and hence, each cell in a cluster performs the cell search in one of the N pilot slots 202, 203, 204, 205. To clearly distinguish between a group and a cluster, consider FIG. 9, where the first cluster consists of cells 1, 2, 3 and, 4, whereas the first group of cells, i.e. the cells performing the cell search at the first slot, consist of cells 1, 5, 9, 13, 17, 21, and 25. The cluster consists of cells performing the cell search at different cell search slots, whereas the cells in a group perform the cell search at the same time. The number of cells in a cluster is N, whereas the number of cells in a group can be much larger, i.e. assuming the cells in the network are equally distributed among the groups, the number of cells in a group is =total number of cells in the network/N.

Figure 13:
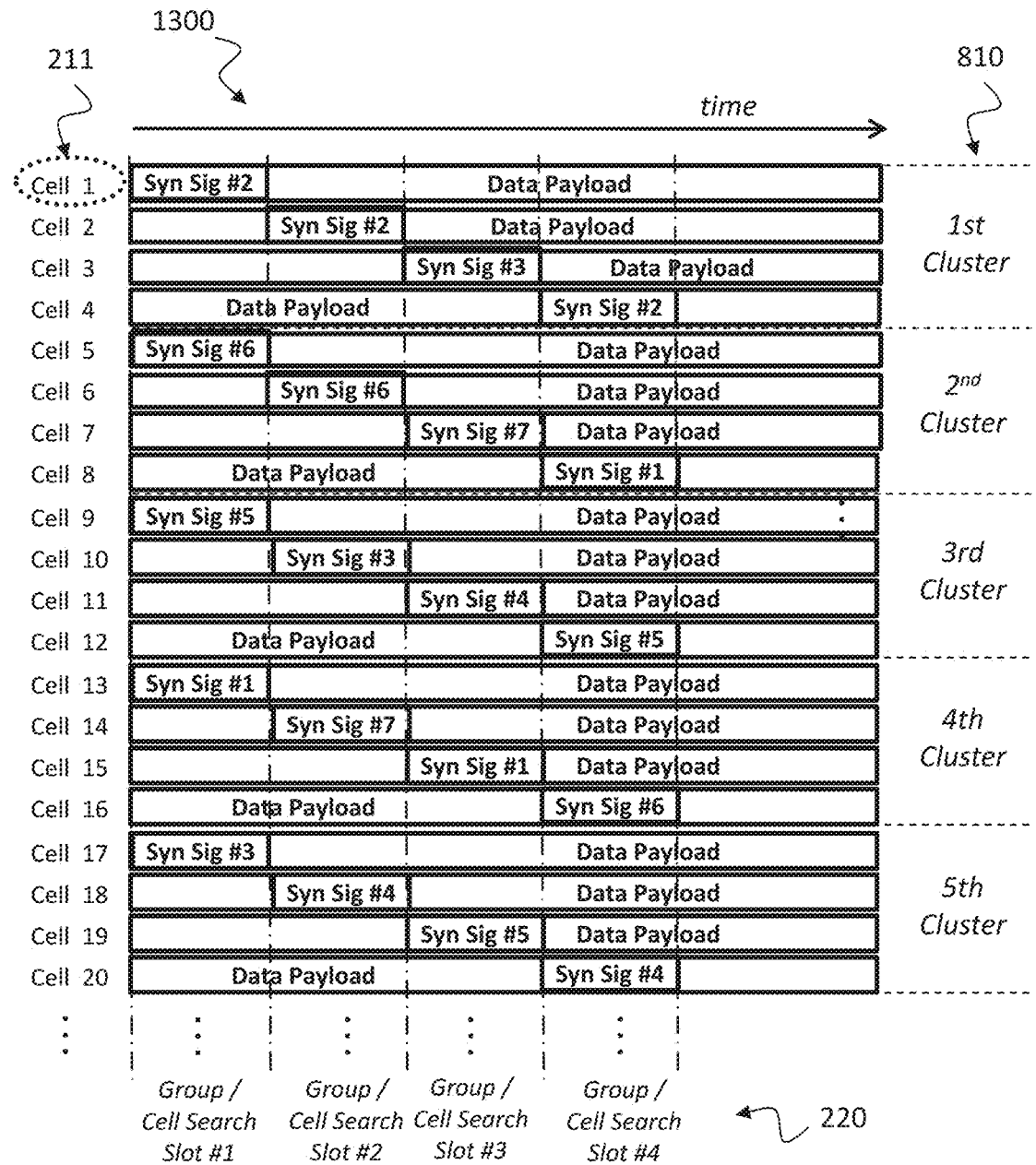
FIG. 13 shows a schematic diagram 1300 illustrating allocation of pilot signals to cell search slots according to a fourth embodiment.

Furthermore, to uniquely define a cluster, the cells in a cluster are assumed to be neighboring cells (e.g., the cluster with cells 1-4 in FIG. 9), where all the neighboring cells in a cluster do not necessarily need to be adjacent or next to each other. The cluster of N cells performing the cell search at different time instances, may also be defined in a different way, i.e. not necessarily consisting of neighboring cells. However, any other definition would still lead to the same embodiments described below. For the following descriptions, a time shifted training structure with N=4 pilot slots is assumed. K=7 available different pilot signals (K=12 for FIG. 13) are considered. In variants of this example, there are only 2, or only 3, or more than 4 pilot slots in the synchronization period (that is, N can be any integer number greater or equal 2). Based on the previous definitions and design principles, in Table 1, five general embodiments of the disclosed concept are provided depending on the reuse pattern of the pilot signals among the groups or pilot slots as well as whether the pilot signals are distinct or reused within a cluster.

TABLE 1

Different embodiments depending on reuse pattern of pilot signals across cells and time.

Figure 11:
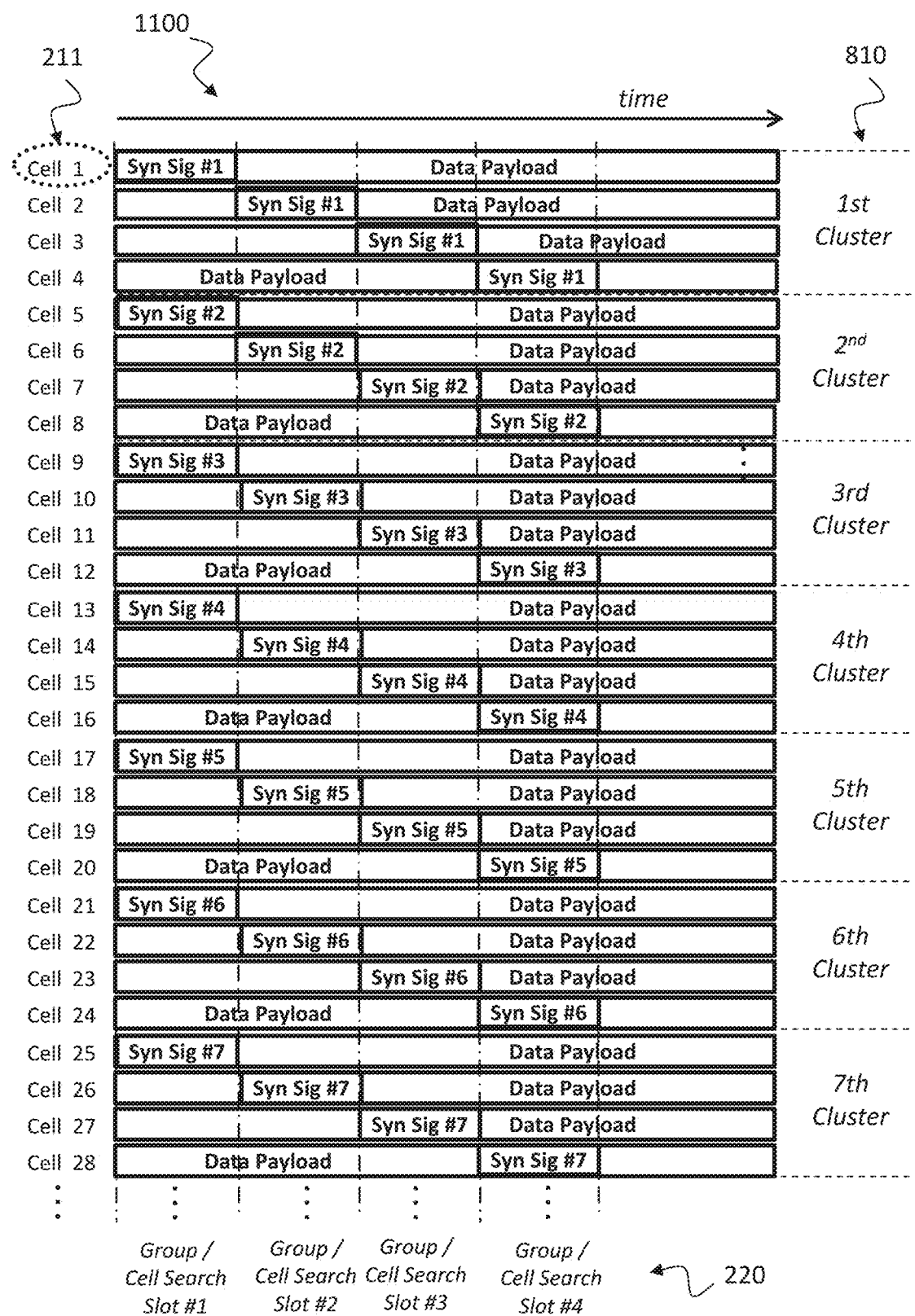
FIG. 11 shows a schematic diagram 1100 illustrating allocation of pilot signals to cell search slots according to a second embodiment.

| | | Distinct Pilot signals within a Cluster | |
| --- | --- | --- | --- |
| | | Yes | No |
| Reuse Pattern of Synchronization Signals | Full | Embodiment 1: Pilot signals reused across all pilot slots and assigned to the cells such that the cells within a cluster use different pilot signals, but not necessarily the same set for each cluster (See FIG. 10) | Embodiment 2: Pilot signals reused across all pilot slots but several cells can employ the same pilot signal within a cluster. Example: all cells in a cluster use the same syn. signal (See FIG. 11) |

TABLE 1-continued

Different embodiments depending on reuse pattern
of pilot signals across cells and time.

Figure 12:
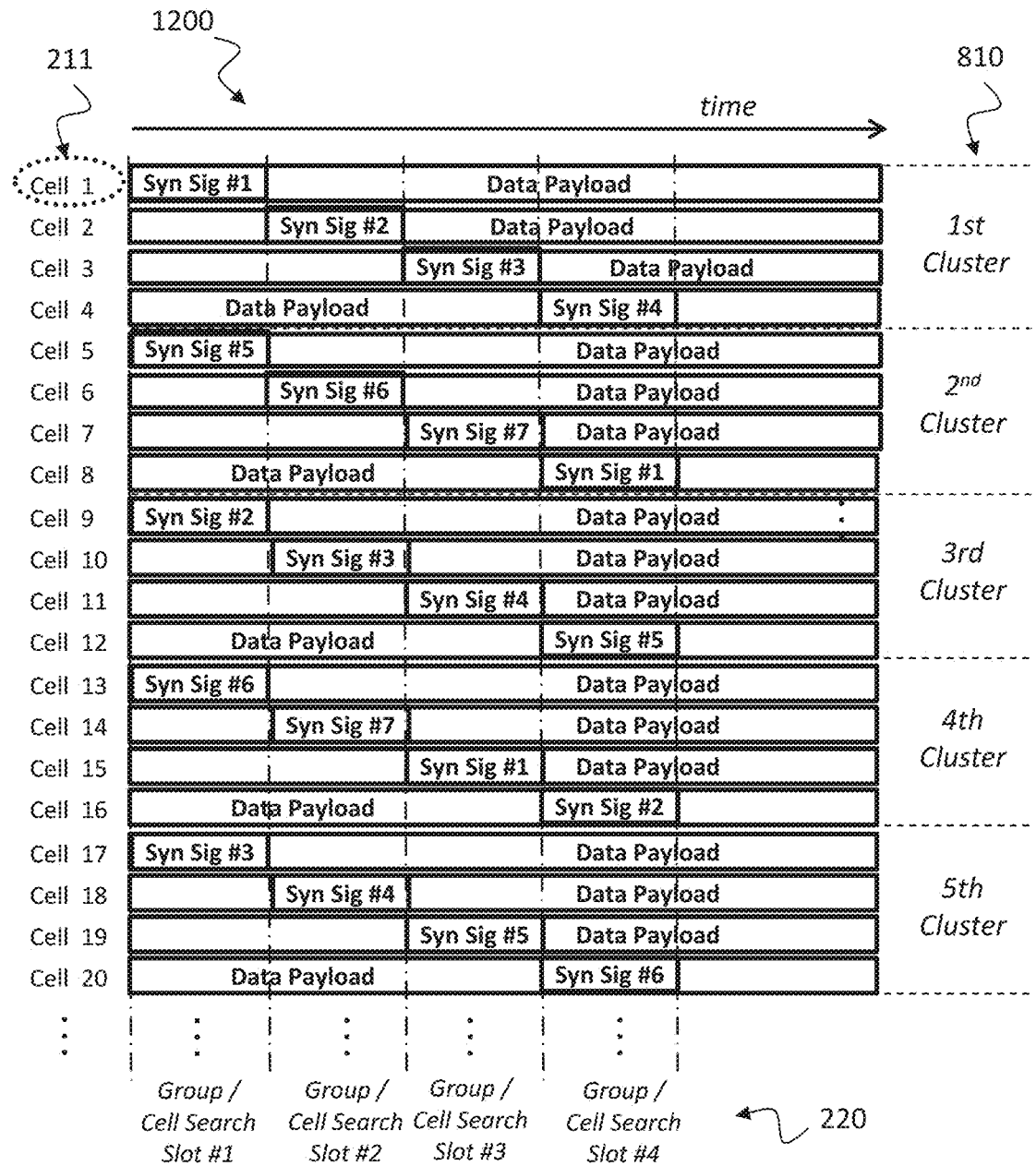
FIG. 12 shows a schematic diagram 1200 illustrating allocation of pilot signals to cell search slots according to a third embodiment.
Figure 14:
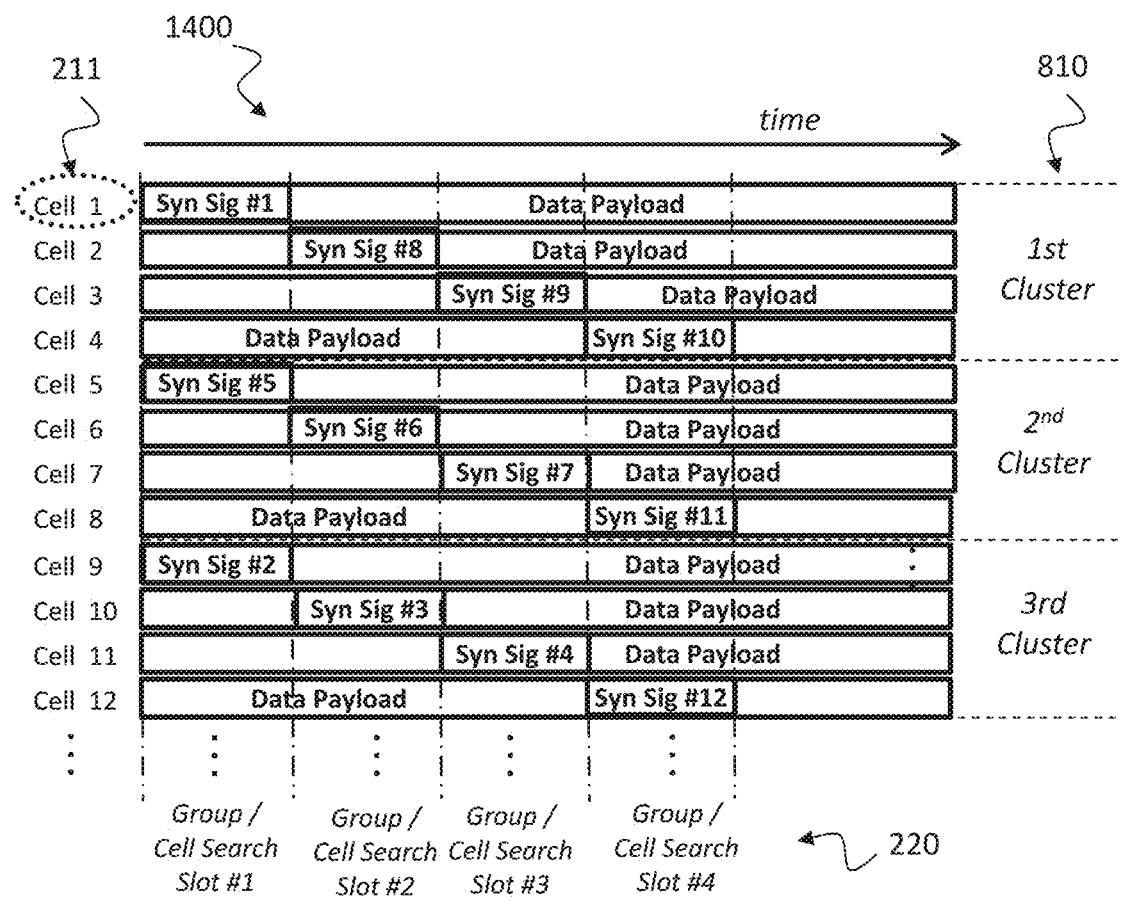
FIG. 14 shows a schematic diagram 1400 illustrating allocation of pilot signals to cell search slots according to a fifth embodiment.

| | Distinct Pilot signals within a Cluster | |
| --- | --- | --- |
| | Yes | No |
| Partial | Embodiment 3: Pilot signals are partially reused across the pilot slots and the assignment to the cells is done such that the cells within a cluster use different pilot signals (See FIG. 12) | Embodiment 4: Pilot signals are partially reused across the pilot slots and the assignment to the cells is done such that some pilot signals are reused within some clusters (See FIG. 13) |
| No reuse | Embodiment 5: Pilot signals are not reused across the pilot slots and also not within a cluster (See FIG. 14) | |

FIGS. 10 to 14 show schematic diagrams illustrating allocation of pilot signals to pilot slots according to five different embodiments.

As observed, different numbers of pilot signals per group are assumed in the figures. For example, J=7 pilot signals (Syn Sig #1 to #7) are used at each pilot slot 220 in FIGS. 10 and 11, J=5 in FIGS. 12 and 13, and J=3 in FIG. 14. In general, the number of cells 210 in a group 220 can be much larger than J, and hence the pilot signals within a group 220 need to be reused among the cells in a group. This is similar to current systems with simultaneous cell search, where the number of cells in a network is much larger than the number of available pilot signals, such that pilot signals are reused throughout the network. FIGS. 10-14 depict an example for the allocation of one set of the pilot signals available within a group or pilot slot. For example, with J=7 in FIGS. 10 and 11, the allocation for 7 clusters 810 is shown. Although the same pattern may be repeated for allocating the pilot signals for the other cells in the network, this is not the case in general, and depends on the network deployment.

As indicated before, the clusters 810 can be defined in a different manner, i.e. not necessarily consisting with neighboring cells. Assume for instance that the clusters 810 in FIG. 10 do not correspond to neighboring cells, and that for instance, cells 1, 22, 15 and 8 actually correspond to a set of neighboring cells. Since these cells are using the pilot signal #1, these cells may be viewed as the first cluster in FIG. 11. In a similar manner, if the cells in FIG. 11 do not correspond to neighboring cells, such that actually for example cells 1, 6, 11 and 16 correspond to neighboring cells, they may be viewed as the first cluster in FIG. 10, since these cells employ the pilot signals #1, #2, #3 and #4.

In a sixth embodiment, the Cell ID is determined. In LTE, the cell ID is calculated from the primary synchronization signal and the secondary synchronization signal employed by the cell. In case the pilot signals are partially or fully reused among the group of cells, i.e. over the pilot slots, the pilot number alone will generally not suffice to determine the cell ID. The pilot number is a pilot identifier included in the pilot signal. For example, referring again to the example of FIG. 10 and assuming that a UE detects a cell with pilot signal #5, the UE still needs to determine whether it is cell 5, 26, 19, or 12.

In accordance with one implementation, the UE determines the cell ID from the combination of pilot number and pilot slot index of the received pilot signal. Different techniques may be employed to determine the pilot slot index.

In one technique, the UE identifies the beginning of the frame and determines the pilot slot index of the received pilot signal based on the time of the pilot signal relative to the beginning of the frame. The beginning of the frame can be determined for example. based on one of the following techniques: (i) operating all cells to transmit a common sequence at the beginning of the frame, or (ii) by performing the cell search for the first group of cells (i.e. in the first pilot slot) in another frequency band as the other groups of cells ( ), or (iii) by having assistance from lower frequencies.

Figure 15:
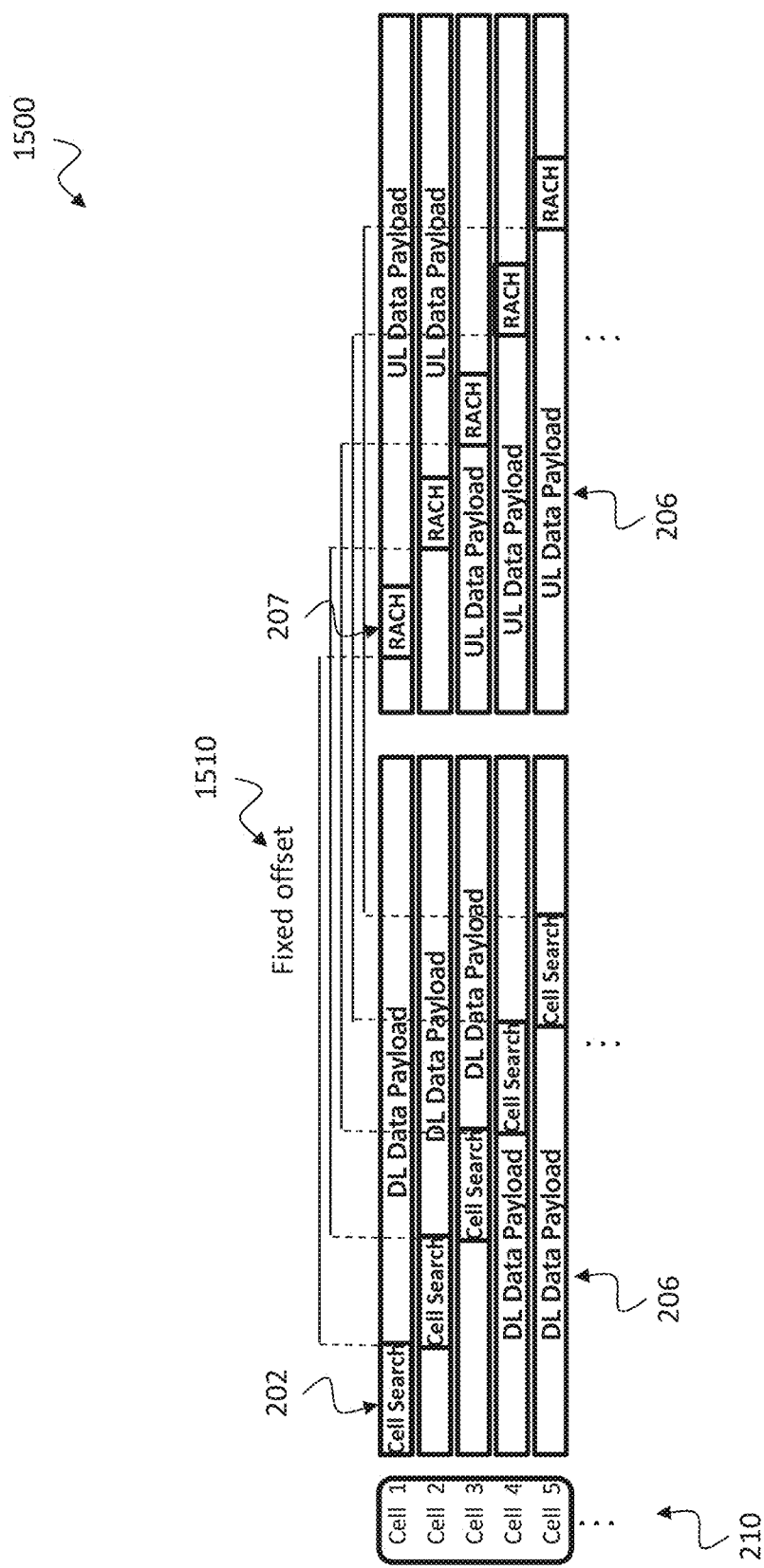
FIG. 15 shows a schematic diagram 1500 illustrating allocation of pilot signals to cell search slots according to a seventh embodiment.

FIG. 15 shows a schematic diagram 1500 illustrating allocation of pilot signals to cell search slots according to a seventh embodiment which is related to Random Access Channel (RACH) Location.

After downlink synchronization in LTE, the UE is informed via the broadcast of system information when to perform the random access in the uplink, which is the final step for initial access. (In LTE, the system information can be decoded with the help of the reference signal, which is determined from the cell ID). To avoid knowing the cell ID for determining the RACH and reduce the overhead of the system information delivery, where the location of the RACH is communicated, the RACH 207 location can be determined with a fixed offset 1510 from the cell search 202 location as shown in FIG. 15. For example, RACH 207 of first group follows cell search 202 of first group with a fixed offset 1510, RACH of second group follows cell search of second group with the same (or another) fixed offset 1510, etc.

Figure 16:
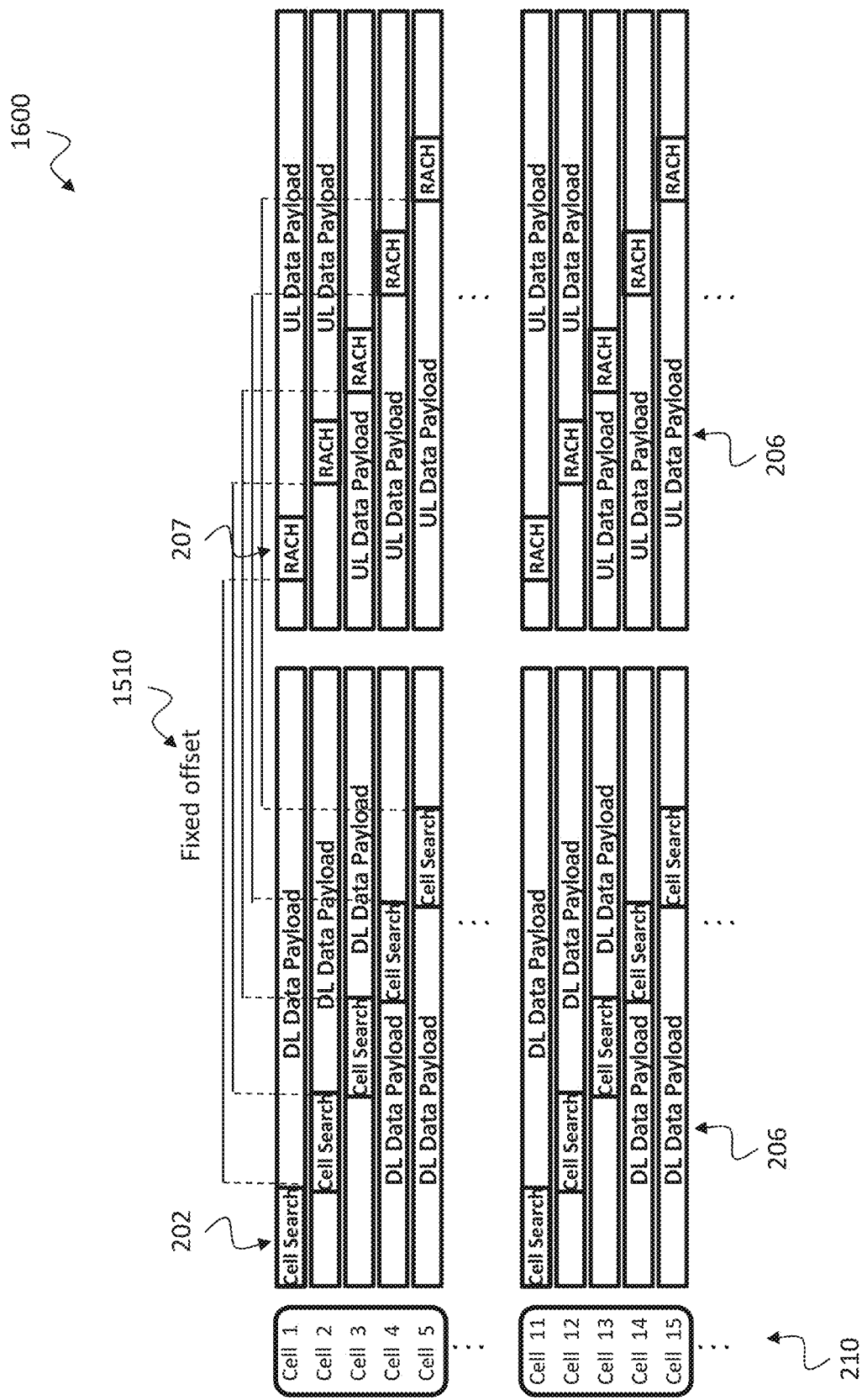
FIG. 16 shows a schematic diagram 1600 illustrating allocation of pilot signals to cell search slots according to an eighth embodiment.

FIG. 16 shows a schematic diagram 1600 illustrating allocation of pilot signals to cell search slots according to an eighth embodiment which is related to synchronization for NR-Lite.

The fixed offset 1510 for determining the location of the RACH 207 described before, enables to employ the same pilot signal in a cluster of neighboring cells for a simplified synchronization/cell search for example for NR-Lite as depicted in FIG. 16 with N=5. Other clusters of neighboring cells may employ a different pilot signal, with the position of the RACH 207 determined as well by the fixed offset 1510 from the cell search location as shown in the figure. Reusing the same pilot signal in adjacent cells and determining the RACH 207 location based on the cell search 202 location reduces the complexity and the overhead in the initial access.

Figure 17:
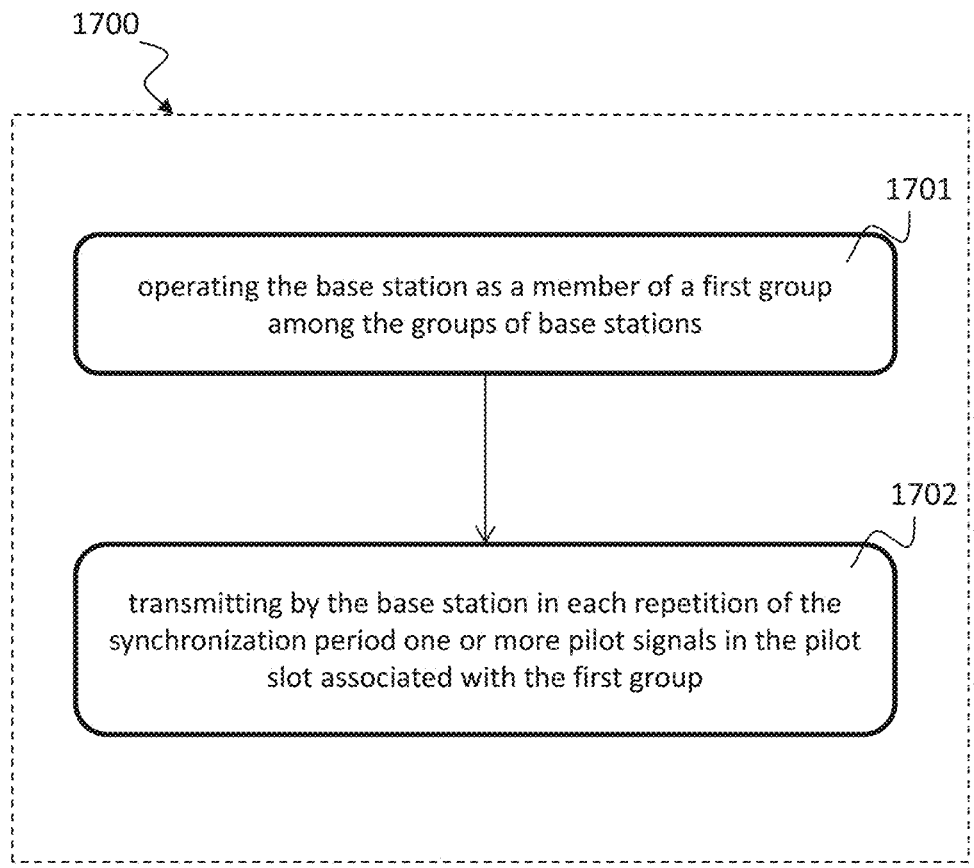
FIG. 17 shows a schematic diagram of a method 1700 of operating a base station in accordance with a periodically repeated synchronization period.

FIG. 17 shows a schematic diagram of a method 1700 of operating a base station in accordance with a periodically repeated synchronization period, wherein the synchronization period comprises a plurality of successive pilot slots, the pilot slots being associated with groups of base stations in a one-to-one relationship.

The method 1700 includes: operating 1701 the base station as a member of a first group among the groups of base stations, e.g., a first group 221 as described above with respect to FIG. 2 and FIGS. 8 to 14. The method 1700 further includes transmitting 1702 by the base station in each repetition of the synchronization period one or more pilot signals in the pilot slot associated with the first group, e.g., as described above with respect to FIGS. 2 to 16.

Figure 18:
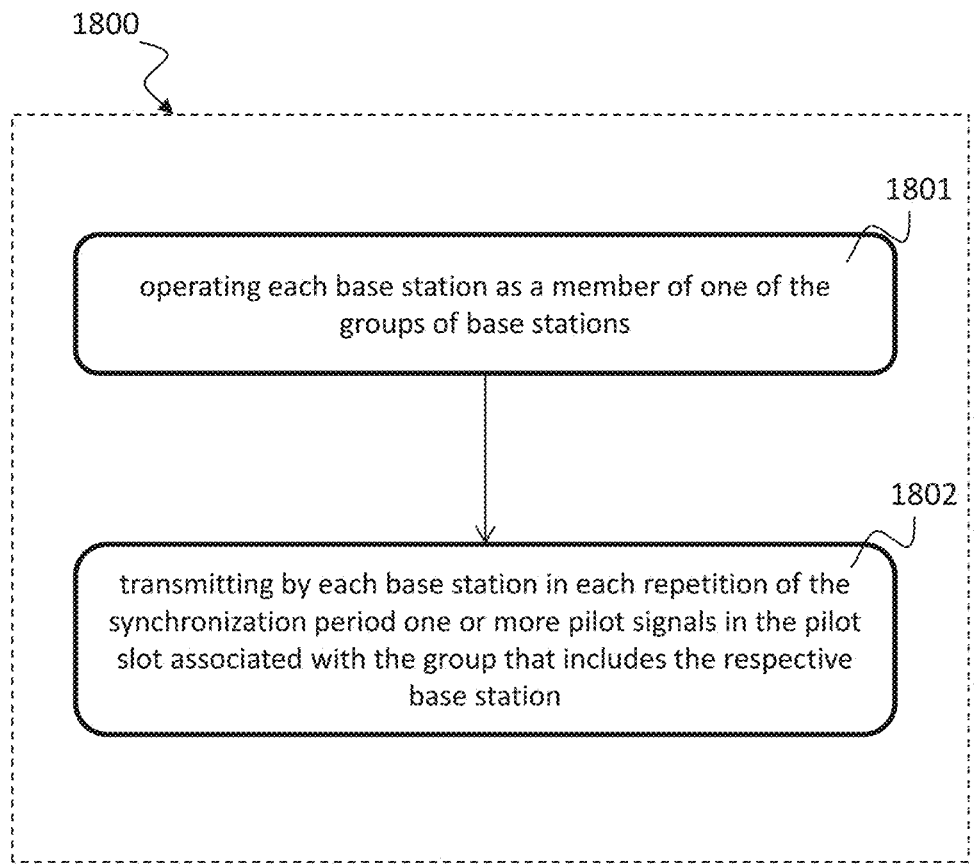
FIG. 18 shows a schematic diagram of a method 1800 of operating a plurality of base stations in accordance with a periodically repeated synchronization period.

FIG. 18 shows a schematic diagram of a method 1800 of operating a plurality of base stations in accordance with a periodically repeated synchronization period, wherein the synchronization period comprises a plurality of successive pilot slots, the pilot slots being associated with groups of base stations in a one-to-one relationship.

The method 1800 includes: operating 1801 each base station as a member of one of the groups of base stations, e.g., a first group 221 as described above with respect to FIG. 2 and FIGS. 8 to 14. The method 1800 further includes transmitting 1802 by each base station in each repetition of the synchronization period one or more pilot signals in the pilot slot associated with the group that includes the respective base station, e.g., as described above with respect to FIGS. 2 to 16.

FIG. 19 shows a schematic diagram of a radio device 1900, e.g., a base station or a User Equipment according to the disclosure. The radio device 1900 includes a processing unit 1901 configured to perform the various data and signal processing operations or a base station or of a User Equipment as described above with respect to FIGS. 2 to 18. The radio device 1900 further includes a transmission/reception stage 1902 controlled by the processing unit 1901 and connected or connectable to an antenna or to an antenna array 1903.

The present disclosure also supports a computer program product including computer executable code or computer executable instructions that, when executed, causes at least one computer to execute the performing and computing steps described herein, in particular the steps of the method described above. Such a computer program product may include a readable non-transitory storage medium storing program code thereon for use by a computer. The program code may perform the processing and computing steps described herein, in particular the method described above.

The time shifted training structure for the cell search/synchronization as described above with respect to FIGS. 2 to 16 can also be employed for transmitting other signals, e.g., reference signals for beam refinement or for estimating the effective channel. Furthermore, compared to the simultaneous cell search, a novel design of pilot signals can also be exploited with the time shifted training structure, e.g. as discussed for the inter cell interference mitigation. The disclosed concept is applicable for both TDD and FDD systems, where rough synchronization among groups of cells may be required (e.g. similar as for cooperative multipoint (CoMP)). The disclosed scheme is also applicable for lower frequencies (e.g. small cells, ultra-dense deployments), but further benefits may be obtained at higher frequencies due to reduced interference at higher frequencies, as well as due to the increased overhead with beam sweeping for the initial access at mmWave.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A base station configured to operate in accordance with a periodically repeated synchronization period, the base station comprising a processor and a transmitter,
    wherein the synchronization period comprises a plurality of successive pilot slots, the plurality of successive pilot slots being associated with groups of base stations in a one-to-one relationship,
    wherein the processor is configured to configure the base station to be a member of a first group among the groups of base stations and to configure the base station in each repetition of the synchronization period to perform a transmission of one or more pilot signals in a pilot slot associated with the first group by generating one or more beams, each of the one or more beams carrying one of the one or more pilot signals,
    wherein the transmitter is configured to cooperate with the processor to transmit, in each repetition of the synchronization period, the one or more pilot signals in the pilot slot associated with the first group,
    wherein each of the one or more pilot signals comprises an identifier of the base station, and
    wherein the identifier of the base station is identical to an identifier in a pilot signal transmitted by a second base station which is a member of a second group among the groups of base stations.

2. The base station of claim 1, wherein the processor is configured to configure the base station not to be a member of any other group among the groups of base stations.

3. The base station of claim 1,
    wherein the plurality of pilot slots include one or more pilot slots that each overlap partly with their respective predecessor.

4. The base station of claim 1,
    wherein the plurality of pilot slots includes one or more pilot slots that each adjoin their respective predecessor.

5. The base station of claim 1,
    wherein the base stations are partitioned into the groups of base stations based on a geographical distribution of the base stations.

6. The base station of claim 1, wherein the one or more pilot signals transmitted by the base station in the pilot slot associated with the first group comprise a plurality of successively transmitted pilot signals.

7. The base station of claim 1, wherein the synchronization period further comprises a no-pilot-transmission period that does not overlap with any of the pilot slots.

8. The base station of claim 1, wherein the processor is configured to configure the base station in each or in one or more repetitions of the synchronization period to transmit data before or after or both before and after transmitting the one or more pilot signals; and
   wherein the transmitter is configured to transmit the data through a same channel for transmitting the one or more pilot signals.

9. A user equipment (UE), arranged to operate in accordance with a periodically repeated synchronization period, the UE comprising a processor and a receiver,
   wherein the synchronization period comprises a plurality of successive pilot slots associated with groups of base stations in a one-to-one relationship,
   wherein the processor is configured to configure the UE in each of the pilot slots in each or in one or more repetitions of the synchronization period,
   wherein the receiver is configured to cooperate with the processor to receive pilot signals from the group of base stations that is associated with the respective pilot slot,
   wherein the processor is further configured to identify or select a base station based on the received pilot signals of the base station and a timing of the pilot slot in which the UE received the pilot signals and perform the identification or selection of the base station by extracting, from each of the received pilot signals, an identifier and determining an index of the pilot slot in which the UE received the respective pilot signal, the identifier and the index forming an identifier-index pair, and comparing the identifier-index pair against entries of a base station list, and
   wherein a base station is configured to be a member of a first group among the groups of base stations and is configured in each repetition of the synchronization period to perform a transmission of one or more pilot signals in a pilot slot associated with the first group by generating one or more beams, each of the one or more beams carrying one of the one or more pilot signals.

10. A method of operating a base station in accordance with a periodically repeated synchronization period, the method applied to a base station,
    wherein the synchronization period comprises a plurality of successive pilot slots, the plurality of successive pilot slots being associated with groups of base stations in a one-to-one relationship,
    wherein the method comprises:
    operating the base station as a member of a first group among the groups of base stations;
    performing, by the base station in each repetition of the synchronization period, a transmission of one or more pilot signals in a pilot slot associated with the first group by generating one or more beams, each of the one or more beams carrying one of the one or more pilot signals; and
    transmitting, by the base station in each repetition of the synchronization period, the one or more pilot signals in the pilot slot associated with the first group,
    wherein each of the one or more pilot signals comprises an identifier of the base station, and
    wherein the identifier of the base station is identical to an identifier in a pilot signal transmitted by a second base station which is a member of a second group among the groups of base stations.

11. The base station of claim 1, wherein the plurality of pilot slots includes one or more pilot slots that are separated from their respective predecessor by a respective time gap.

12. The method of claim 10, further comprising: operating the base station not to be a member of any other group among the groups of base stations.

* * * * *